US010361589B2

(12) United States Patent
Kato

(10) Patent No.: US 10,361,589 B2
(45) Date of Patent: Jul. 23, 2019

(54) POWER TRANSMISSION DEVICE, AND POWER TRANSMITTER AND POWER RECEIVER FOR THE SAME

(71) Applicant: TOSHIBA TEC KABUSHIKI KAISHA, Tokyo (JP)

(72) Inventor: Masakazu Kato, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 177 days.

(21) Appl. No.: 15/405,244

(22) Filed: Jan. 12, 2017

(65) Prior Publication Data
US 2017/0155286 A1 Jun. 1, 2017

Related U.S. Application Data

(63) Continuation of application No. 14/148,196, filed on Jan. 6, 2014, now Pat. No. 9,583,966.

(30) Foreign Application Priority Data

Jan. 7, 2013 (JP) .................................. 2013-000467

(51) Int. Cl.
*H02J 50/12* (2016.01)
*H01F 27/28* (2006.01)
(Continued)

(52) U.S. Cl.
CPC .......... *H02J 50/12* (2016.02); *H01F 27/2871* (2013.01); *H01F 38/14* (2013.01);
(Continued)

(58) Field of Classification Search
CPC .......... H02J 50/12; H02J 50/90; H02J 7/0044; H02J 7/025; H02J 17/00; H01F 27/2871; H01F 38/14
(Continued)

(56) References Cited

U.S. PATENT DOCUMENTS 6,597,076 B2 7/2003 Scheible et al.
7,741,734 B2 6/2010 Joannopoulos et al.
(Continued)

FOREIGN PATENT DOCUMENTS

JP 2005-110399 A 4/2005
JP 2011-050140 A 3/2011
(Continued)

OTHER PUBLICATIONS

Japanese Office Action with English Translation, Patent Application No. JP 2013-000467, dispatch dated Mar. 4, 2015.
(Continued)

*Primary Examiner* — Hal Kaplan
(74) *Attorney, Agent, or Firm* — Kim & Stewart LLP

(57) ABSTRACT

A power transmission device performs contactless power transmission from a power transmitter to a power receiver. The power transmitter includes a main body supporting the power receiver by first and second surfaces that are disposed adjacent to each other, a power transmitting coil disposed within the main body and having a first coil portion corresponding to the first surface and a second coil portion corresponding to the second surface, and a power source supplying power to the power transmitting coil. The power receiver includes a main body having a third surface and a fourth surface opposed to the first and second surfaces, respectively, and a power receiving coil disposed within the main body and having a third coil portion corresponding to the third surface and a fourth coil portion corresponding to the fourth surface.

19 Claims, 26 Drawing Sheets

(51) Int. Cl.
   *H01F 38/14* (2006.01)
   *H02J 50/90* (2016.01)
   *H02J 7/02* (2016.01)
   *H02J 7/00* (2006.01)
   *H02J 17/00* (2006.01)

(52) U.S. Cl.
   CPC ............ *H02J 7/0044* (2013.01); *H02J 7/025* (2013.01); *H02J 17/00* (2013.01); *H02J 50/90* (2016.02)

(58) Field of Classification Search
   USPC ........................................................ 307/104
   See application file for complete search history.

(56) References Cited

U.S. PATENT DOCUMENTS

| | | | |
|---|---|---|---|
| 7,825,543 B2 | 11/2010 | Karalis et al. | |
| 8,890,470 B2 | 11/2014 | Partovi | |
| 9,065,284 B2 | 6/2015 | Malpas et al. | |
| 2011/0316353 A1* | 12/2011 | Ichikawa | H02J 7/0044 307/149 |
| 2013/0099586 A1 | 4/2013 | Kato | |

FOREIGN PATENT DOCUMENTS

| | | | | |
|---|---|---|---|---|
| JP | 2012-044827 | * | 3/2012 | ............... H02J 7/00 |
| JP | 2012-044827 A | | 3/2012 | |

OTHER PUBLICATIONS

Uchida et al., "Phase and Intensity Control of Multiple Coil Currents in Resonant Magnetic Coupling", Device and Materials Laboratories, Fujitsu Laboratories Limited, 2012 IEEE IMWS-IWPT2012 Proceedings, pp. 53-56.

* cited by examiner

FIG. 5A

| POSITION OF POWER RECEIVING COIL 22 | DISTANCE H | OPPOSED AREA (13-22) | DISTANCE W | OPPOSED AREA (14-22) |
|---|---|---|---|---|
| P1 | H1 | J1×m | W1 | K1×m |
| P2 | H2 | J2×m | W2 | K2×m |
| P3 | H3 | J3×m | W3 | K3×m |

FIG. 5B

| POSITION OF POWER RECEIVING COIL 22 | DISTANCE H | OPPOSED AREA (13-22) | DISTANCE W | OPPOSED AREA (14-22) |
|---|---|---|---|---|
| P1 | B | C | B | C |
| P2 | A | A | A | A |
| P3 | C | B | C | B |

FIG. 7A

| POSITION OF POWER RECEIVING COIL 22 | DISTANCE H | OPPOSED AREA (13-22) | DISTANCE W | OPPOSED AREA (14-22) |
|---|---|---|---|---|
| P1 | H1 | J1×m | W1 | K1×m |
| P4 | H1 | J4×m | W4 | K1×m |
| P5 | H1 | J5×m | W5 | K1×m |

FIG. 7B

| POSITION OF POWER RECEIVING COIL 22 | DISTANCE H | OPPOSED AREA (13-22) | DISTANCE W | OPPOSED AREA (14-22) |
|---|---|---|---|---|
| P1 | A | C | B | A |
| P4 | A | A | A | A |
| P5 | A | B | C | A |

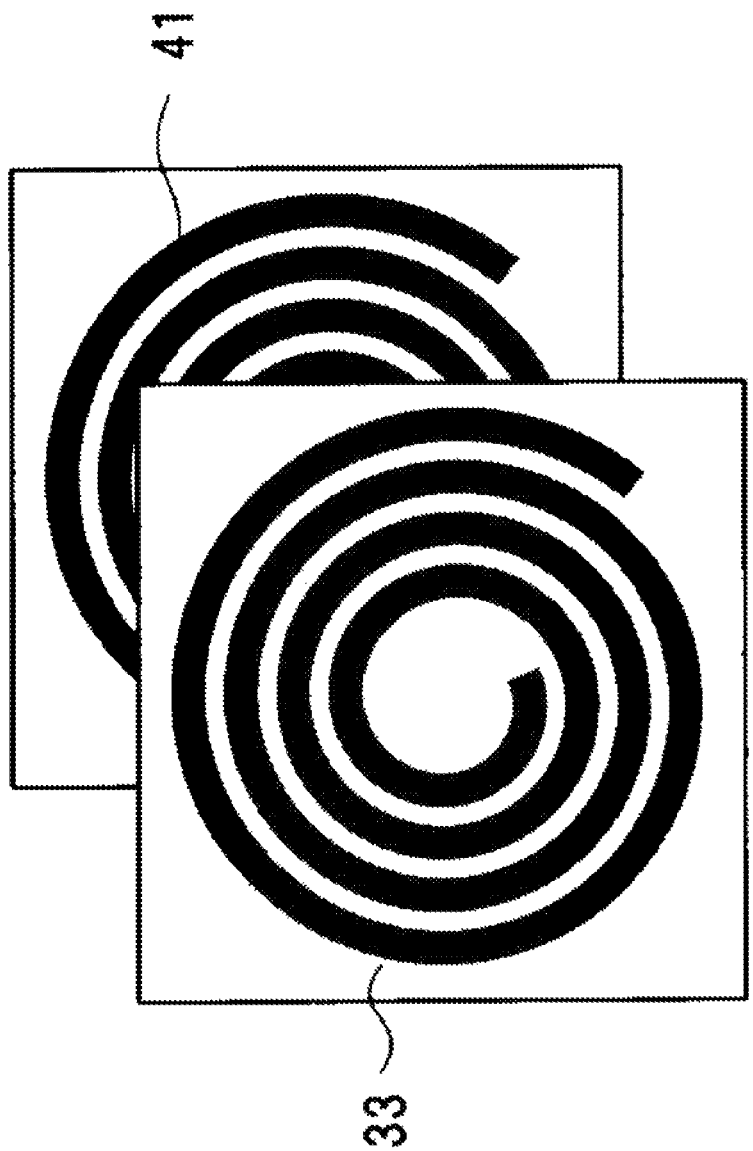

POWER TRANSMISSION DEVICE, AND POWER TRANSMITTER AND POWER RECEIVER FOR THE SAME

CROSS-REFERENCE TO RELATED APPLICATION

This application is a continuation of U.S. patent application Ser. No. 14/148,196, filed on Jan. 6, 2014, which claims the benefit of priority of Japanese Patent Application No. 2013-000467, filed Jan. 7, 2013, the entire contents of which are incorporated herein by reference.

FIELD

Embodiments described herein relate generally to a power transmitter, a power receiver, and a power transmission device which performs contactless power transmission from the power transmitter to the power receiver.

BACKGROUND

Recently, power transmission devices performing contactless power transmission have been widely used. The power transmission device includes a power transmitter for transmitting power, and a power receiver for receiving transmitted power. The power transmission device executes contactless power transmission from the power transmitter to the power receiver using electromagnetic induction system, magnetic field resonance system, electric field coupling system, or the like. The power receiver contains a driving circuit for driving itself, a charging circuit for charging a secondary battery mounted on the power receiver, and the like.

For contactless transmission of power (up to about several tens of watts) to a portable terminal, a notebook computer or other electronic devices, it is generally required to bring the power transmitter and the power receiver into very close proximity with each other within the power transmittable range when the electromagnetic induction system or the electric field coupling system is used. On the other hand, when the magnetic field resonance system is used, the requirement of very close proximity between the power transmitter and the power receiver is not as stringent. For example, power transmission is capable even when the power receiver is separated from the power transmitter by several centimeters. Accordingly, the magnetic field resonance system is attracting attention in view of the advantage provided by the system that the power receiver may be more freely positioned and therefore more easily handled.

The magnetic field resonance system can transmit power by using coupling between a resonance element composed of a coil and a capacitor provided on the power transmitter, and a resonance element composed of a coil and a capacitor provided on the power receiver. In the electromagnetic induction systems, an attempt to increase the power transmission distance is similarly made by providing a resonance capacitor on each of the power transmitting side and the power receiving side and allowing resonance coupling between the element on the power transmitting side and the element on the power receiving side as well as coupling between the coil on the power transmitting side and the coil on the power receiving side. Thus, the differences between the magnetic field resonance system and the electromagnetic induction system are becoming less noticeable.

Parameters affecting power transmission efficiency include a coupling coefficient k between the resonance elements of the power transmitter and the power receiver. When the distance between the resonance elements of the power transmitter and the power receiver changes, the coupling coefficient k generally varies in accordance with the change in the distance. For example, when the distance between the resonance elements increases, the coupling coefficient k becomes smaller. When the impedance of a circuit is constant, power transmission efficiency varies in accordance with the change in the coupling coefficient k.

There exists technology for maintaining high power transmission efficiency even when the coupling coefficient k varies in accordance with the change in the distance between the resonance elements of the power transmitter and the power receiver. Such technology employs an impedance adjuster that changes the impedance of the power transmitter and the power receiver according to variations in the coupling coefficient k.

According to this technology, however, an additional circuit for automatically controlling the impedance in response to changes in the coupling coefficient k is required. This causes a problem in that control becomes more complicated.

DESCRIPTION OF THE DRAWINGS

FIGS. 5A and 5B show the relationship between the distance between the power transmitting coils and the power receiving coil and the opposed areas of the power transmitting coils and the power receiving coil shown in FIG. 4.

FIGS. 7A and 7B show the relationship between the distance between the power transmitting coils and the power receiving coil and the opposed areas of the power transmitting coils and the power receiving coil shown in FIG. 6.

FIGS. 8A and 8B are a block diagram and an illustration of a coil structure, respectively, of a conventional power transmission device.

DETAILED DESCRIPTION

In general, embodiments provide a contactless type power transmission device which reduces variations of a coupling coefficient k even when the distance between a power transmitting coil of a power transmitter and a power receiving coil of a power receiver changes.

According to an embodiment, power transmission device for performing contactless power transmission from a power transmitter to a power receiver includes a main body supporting the power receiver by first and second surfaces that are disposed adjacent to each other, a power transmitting coil disposed within the main body and having a first coil portion corresponding to the first surface and a second coil portion corresponding to the second surface, and a power source supplying power to the power transmitting coil. The power receiver includes a main body having a third surface and a fourth surface opposed to the first and second surfaces, respectively, and a power receiving coil disposed within the main body and having a third coil portion corresponding to the third surface and a fourth coil portion corresponding to the fourth surface.

Exemplary embodiments are hereinafter described with reference to the drawings. Similar parts are given similar reference numbers in the respective figures.

(First Embodiment)

Figure 1A:
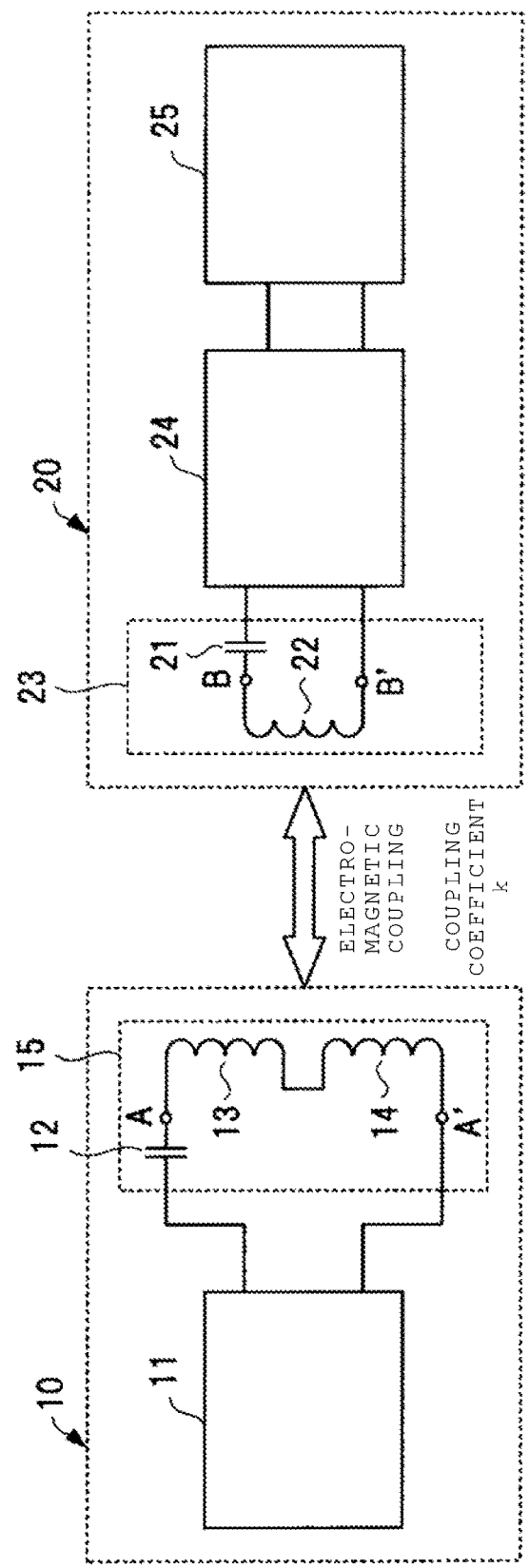
FIGS. 1A and 1B are a block diagram and a perspective view, respectively, illustrating the structure of a power transmission device according to a first embodiment.
Figure 1B:
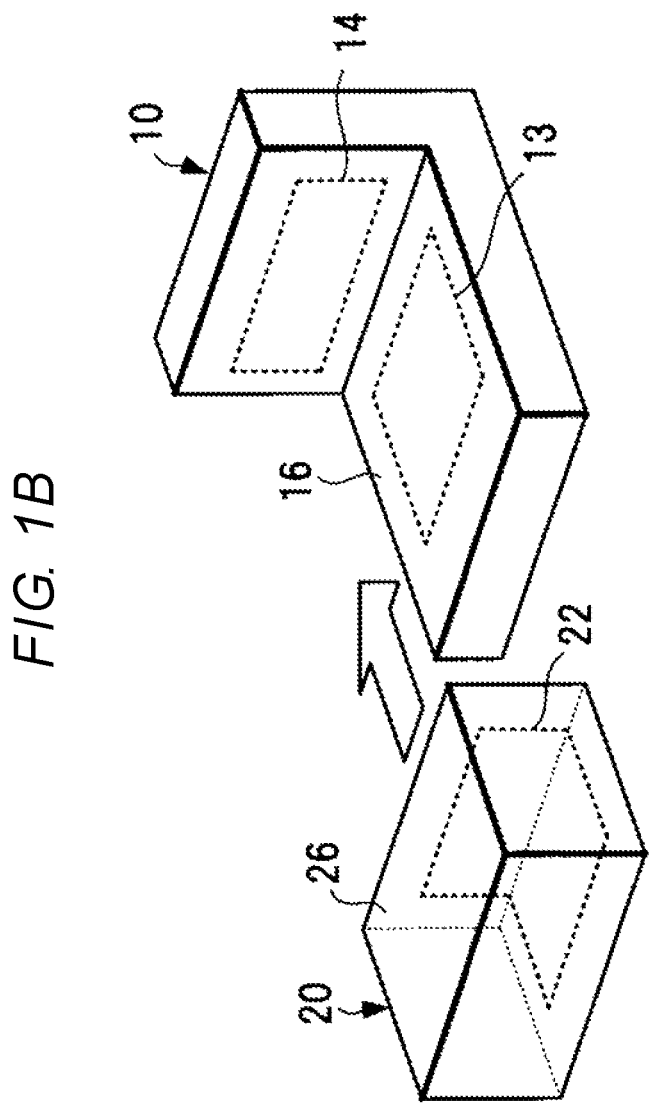

FIG. 1A is a block diagram showing the structure of a power transmission device according to an embodiment. FIG. 1B is a perspective view schematically illustrating a power transmitter and a power receiver. As illustrated in FIG. 1A, the power transmission device includes a power transmitter 10 which transmits power, and a power receiver 20 which receives transmitted power. Power transmission between the power transmitter 10 and the power receiver 20 is achieved by a system utilizing electromagnetic coupling such as magnetic field resonance system or electromagnetic induction system. An example device which transmits power using the magnetic field resonance system or the electromagnetic induction system is herein discussed.

The power transmitter 10 includes an alternating current power source 11 for generating power, and a resonance element 15 composed of a resonance capacitor 12 and power transmitting coils 13 and 14. The alternating current power source 11 generates alternating current power having a frequency equal to, or substantially equal to the self-resonance frequency of the resonance element 15 for power transmission, and supplies the generated alternating current power to the resonance element 15. The alternating current power source 11 includes an oscillation circuit for generating alternating current power having a desired frequency, and a power amplification circuit which amplifies the output from the oscillation circuit. Alternatively, the alternating current power source 11 may be constructed as a switching power source which turns on or off switching elements based on the output from the oscillation circuit.

The alternating current power source 11 is configured so as to receive supply of direct current power from an AC adapter or the like provided outside the power transmitter 10. Alternatively, the power transmitter 10 may receive supply of AC 100V from the outside, and supply direct current power to the alternating current power source 11 via an AC adapter or an AC/DC converter provided within the power transmitter 10.

The power receiver 20 includes a resonance element 23 composed of a resonance capacitor 21 and a power receiving coil 22, a rectification circuit 24 which converts alternating current to direct current, and a load circuit 25. The self-resonance frequency of the resonance element 23 for power reception is equal to, or substantially equal to the self-resonance frequency of the resonance element 15 for power transmission. Accordingly, power is efficiently transmitted from the power transmitting side to the power receiving side by mutual electromagnetic coupling.

The load circuit 25 is a circuit of an electronic device such as a portable terminal and a portable printer. The power received by the power receiver 20 is used for operation of the electronic device, charge of a battery contained in the electronic device, or for other purposes. Generally, the load circuit 25 operates by direct current power, wherefore the rectification circuit 24 which rectifies alternating current power induced in the resonance element 23 for power reception and converts the rectified alternating current power to direct current power is equipped to supply direct current power to the load circuit 25.

The resonance capacitors 12 and 21 are not required to be formed as electronic parts, but maybe realized by inter-line capacities of the coils as alternatives depending on the shape of the coils and the inductance of the coils.

The resonance capacitor 12 is disposed in series with the coils 13 and 14, while the resonance capacitor 21 is disposed in series with the coil 22, constituting a series resonance circuit for each. However, each of the resonance capacitors 12 and 22 may be disposed in parallel with the coil so as to constitute a parallel resonance circuit structure.

As illustrated in FIG. 1B, the power transmitting coils 13 and 14 of the power transmission device shown in FIG. 1A overlaps the power receiving coil 22 of the power receiver 20 for power transmission to the power receiver 20. More specifically, when current is supplied to the power transmitting coils 13 and 14, magnetic fields are generated in the power transmitting coils 13 and 14. On the other hand, current is generated in the power receiving coil 22 by the effect of electromagnetic coupling, and flows in the power receiving coil 22. This current is rectified, by which process power is allowed to be extracted.

As illustrated in FIG. 1B, the power transmitter 10 has a housing 16 corresponding to an L-shaped main body on which the power receiver 20 is carried. The power transmitting coils 13 and 14 are disposed inside the L-shaped wall surface of the housing 16 in such a condition as to cross each other substantially at right angles. The power receiver 20 has a housing 26 corresponding to a square-shaped main body and configured so as to be placed on the power transmitter 10. The power receiving coil 22 is bent substantially at 90 degrees and disposed near the surface included in the housing 26 of the power receiver 20 and positioned opposed to the power transmitting coils 13 and 14.

Figure 2A:
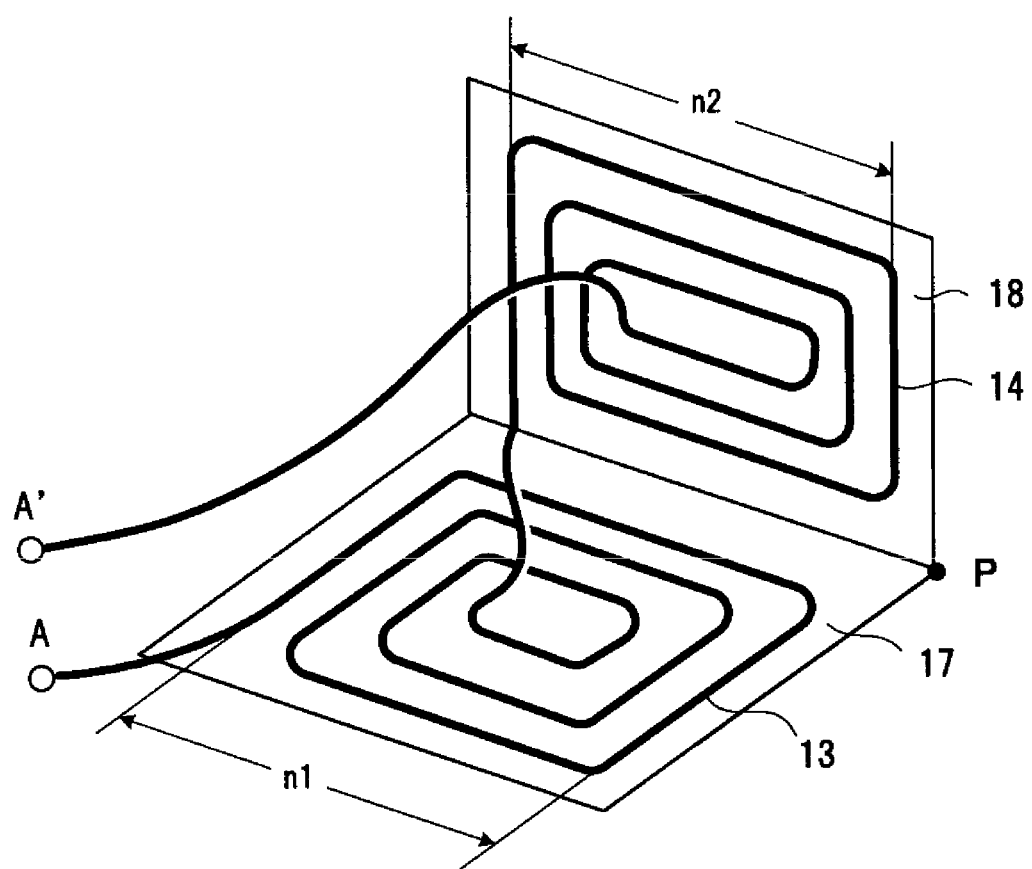
FIGS. 2A and 2B are perspective views schematically illustrating the structures of power transmitting coils and a power receiving coil according to the first embodiment.
Figure 2B:
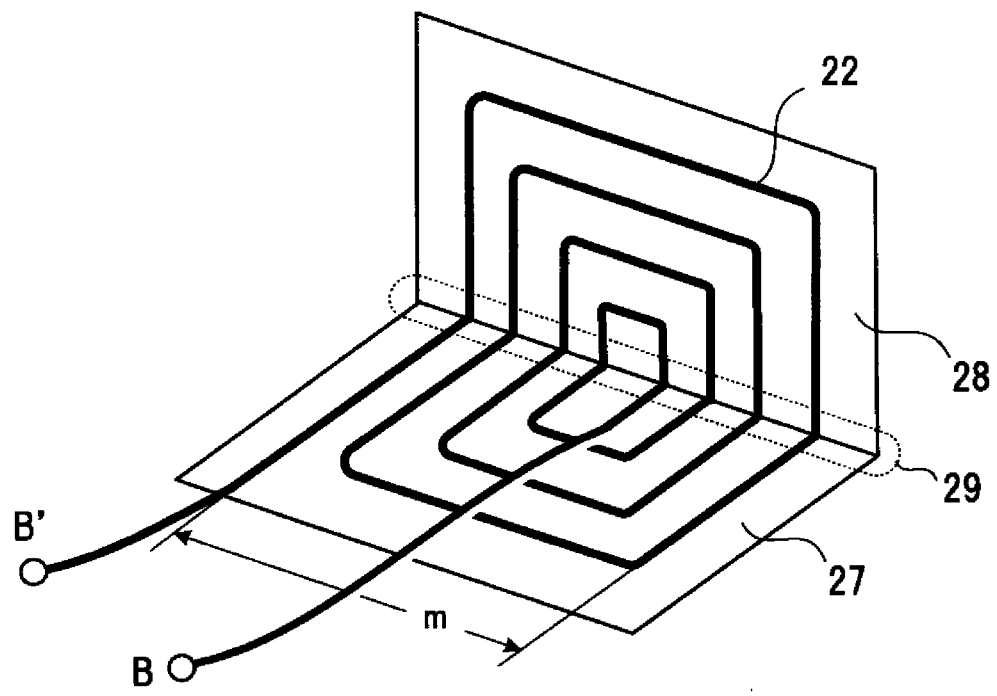

FIGS. 2A and 2B are perspective views schematically illustrating the structures of the power transmitting coils 13 and 14 and the power receiving coil 22, respectively. FIG. 2A shows the power transmitting coils 13 and 14, while FIG. 2B shows the power receiving coil 22. As illustrated in FIG. 2A, the power transmitting coils 13 and 14 are disposed within the main body (housing 16), more particularly, respectively in close proximity to two surfaces 17 and 18 (first and second surfaces) of the power transmitter 10, to form an L shape, and are connected in series. Ends A and A' of lines extended from the power transmitting coils 13 and 14 correspond to terminals A-A' included in the power transmitter 10 shown in FIG. 1A. The ends A and A' may be switched. Each of the power transmitting coils 13 and 14 is formed by a single copper wire, or a litz wire including plural lines, for example, wound on the two surfaces 17 and 18. Alternatively, each of the power transmitting coils 13 and 14 may be formed by a printed coil provided on a rigid or flexible printed board, for example.

As illustrated in FIG. 2B, the power receiving coil 22 has a shape formed by a single coil curved or bent substantially at 90 degrees, and is disposed within the main body (housing 26) in correspondence with two surfaces 27 and 28 (third and fourth surfaces) of the power receiver 20. Ends B and B' of lines extended from the power receiving coil 22 correspond to parts B-B' included in the power receiver 20 shown in FIG. 1A. The ends B and B' may be switched to each other. The power receiving coil 22 is formed by winding a single copper wire, or a litz wire including plural lines, for example. Alternatively, the power receiving coil 22 may be formed by a printed coil provided on a flexible printed board, for example.

For contactless power transmission from the power transmitter 10 to the power receiver 20, the power receiver 20 is carried on the housing 16 of the power transmitter 10 in such a condition that the power transmitting coils 13 and 14 shown in FIG. 2A and the power receiving coil 22 shown in FIG. 2B are opposed to each other. The power transmitter 10 supports the power receiver 20 via the first surface 17 and the second surface 18 positioned adjacent to each other.

Figure 3:
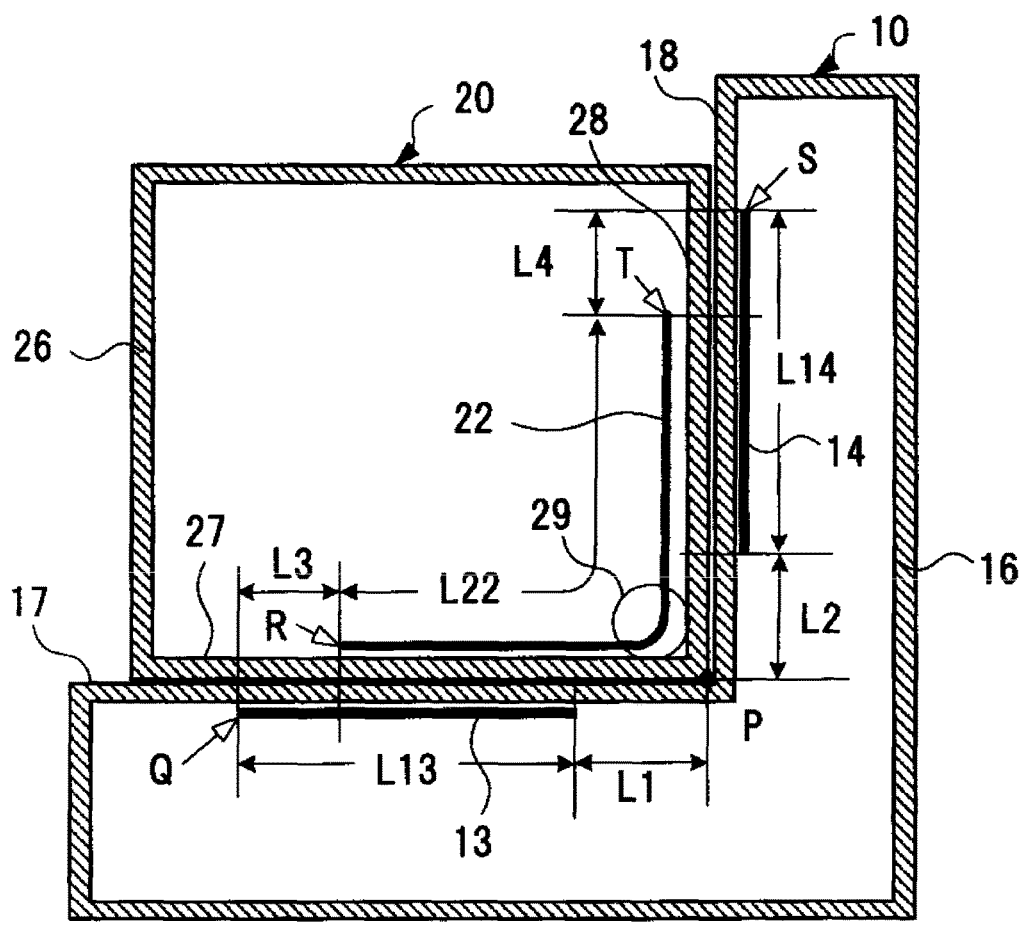
FIG. 3 is a cross-sectional view showing the positional relationship between the power transmitting coils and the power receiving coil.

FIG. 3 is a cross-sectional view showing the positional relationship between the power transmitting coils 13 and 14 and the power receiving coil 22, having a length L22, when the power receiver 20 is carried on the power transmitter 10. As illustrated in FIG. 3, the power transmitting coils 13 and 14 are disposed on the two adjoining surfaces 17 and 18 of the power transmitter 10, while the power receiving coil 22 is disposed on the two surfaces 27 and 28 of the power receiver 20. The intersection of the surface 17 and the surface 18 of the power transmitter 10 is indicated by an intersection P in FIGS. 2A and 3.

As can be seen from FIG. 3, the power transmitter 10 has the housing 16 made of resin, for example, and having a certain thickness. Each of the surfaces 17 and 18 is required to have a thickness producing sufficient strength for supporting the power receiver 20. When the power transmitter 10 carries the power receiver 20 such as a portable device having a weight approximately in the range from 500 g to 1 kg, the surface 17 made of typical resin needs to have a thickness of approximately 2 mm to 3 mm, depending on the weight of the power receiver 20. Generally, each of the power transmitting coils 13 and 14 is disposed inside with respect to the surfaces 17 and 18 of the housing 16 considering the safety, durability or other factors.

The power receiver 20 has the housing 26, and the power receiving coil 22 is disposed along the surfaces 27 and 28 of the housing 26 opposed to the power transmitting coils 13 and 14. According to the example shown in FIG. 3, the power receiving coil 22 is disposed within the housing 26 along the surfaces 27 and 28. However, the power receiving coil 22 is not required to be positioned inside the housing 26 but may be disposed outside the housing 26, in which case the power receiving coil 22 is covered by a protection film, for example, for insulation treatment.

As illustrated in FIG. 2B, the power receiving coil 22 is formed by a curved or bent single coil. In this case, a bent portion 29 of the power receiving coil 22 may be a portion bent at an angle equivalent to the angle formed by the surfaces 27 and 28 crossing each other, i.e., the right angle, or a portion bent or curved to form an appropriate circular arc as illustrated in FIG. 3.

As illustrated in FIG. 3, the power transmitting coils 13 and 14 are disposed away from the intersection P of the surfaces 17 and 18 by appropriate distances L1 and L2 along the surfaces 17 and 18 so that the power transmitting coils 13 and 14 do not contact or tightly contact each other. As illustrated in FIG. 3, a part Q of the power transmitting coil 13, which is positioned farthest from the intersection P along the surface 17 in the position where the power transmitting coils 13 and 14 and the power receiving coil 22 come closest to each other, is located by a distance L3 away from a part R of the power receiving coil 22 positioned farthest from the intersection P along the surface 27.

Similarly, a part S of the power transmitting coil 14 positioned farthest from the intersection P along the surface 18 is located by a distance L4 away from a part T of the power receiving coil 22 positioned farthest from the intersection P along the surface 28. Thus, under the condition in which the power transmitting coils 13 and 14 and the power receiving coil 22 come closest to each other, each of the power transmitting coils 13 and 14 is positioned at a longer distance from the intersection P than the distance between the power receiving coil 22 and the intersection P.

The optimum distances of the distances L1, L2, L3, and L4 vary in accordance with the sizes or other conditions of the power transmitting coils 13 and 14 and the power receiving coil 22 to be used. However, it is needed to dispose the power transmitting coils 13 and 14 at positions away from the intersection P by the appropriate distances L1 and L2, and secure the distances L3 and L4.

The operation of the power transmission device according to this embodiment is now explained. The positional relationship between the power transmitting coils 13 and 14 and the power receiving coil 22 shown in FIG. 3 is the relationship under the condition of the normal use, that is, the condition in which the power receiver 20 as a portable device to be charged is placed at the closest position to the power transmitter 10 as a charging stand. For example, when the portable device is placed on the charging stand while contained in a case such as a soft case or a carrying case for portability or protection, the distance between the power transmitting coils 13 and 14 and the power receiving coil 22 increases by the thickness of the case.

According to a structure in related art, a coupling coefficient k varies when the distance between the power transmitting coils and the power receiving coil changes. In this case, the amount of power allowed to be received by the power receiver 20 and the power transmission efficiency change when a circuit constant is not varied. In related art, the power allowed to be received becomes the maximum at a certain distance inmost cases, and lowers when the distance increases or decreases.

According to this embodiment, the coupling coefficient k does not change by very much even when the distance between the coils varies. Accordingly, the amount of power allowed to be received and the power transmission efficiency does not change by very much. Discussed herein are the reasons.

Figure 4:
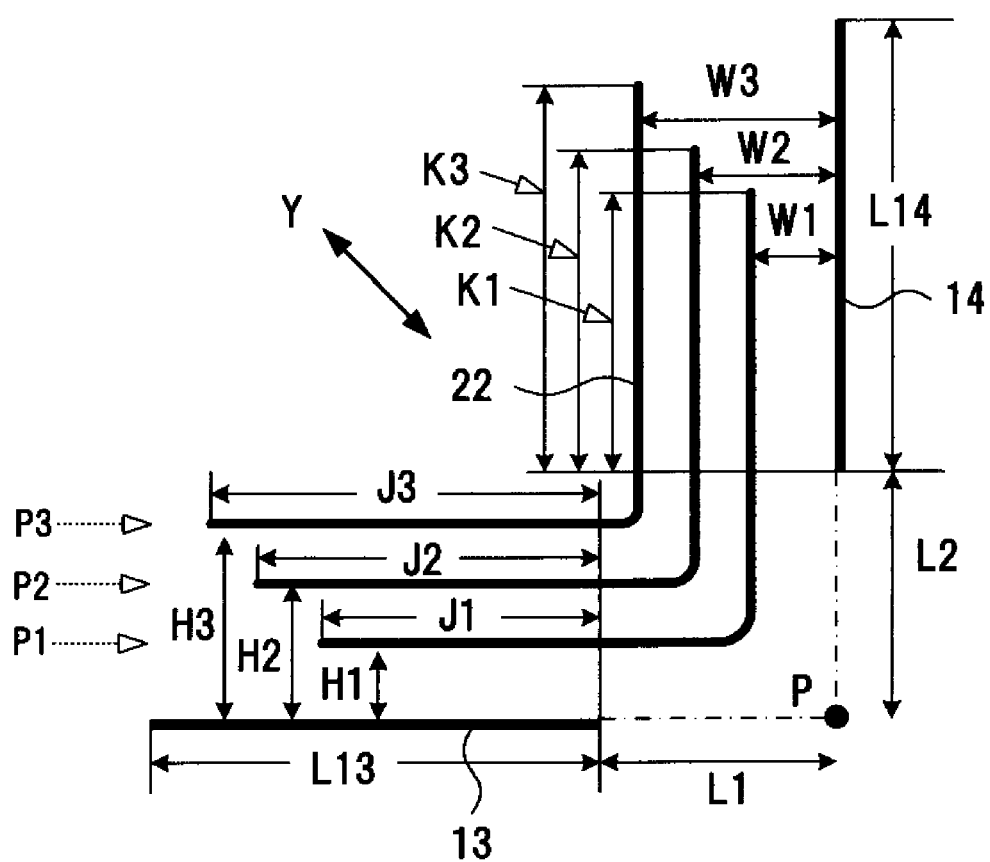
FIG. 4 illustrates coupling coefficient changes in response to positional change in the power transmitting coils and the power receiving coil according to the first embodiment.

FIG. 4 illustrates effects on the coupling coefficient k produced when the distance between the power transmitting coils 13 and 14 and the power receiving coil 22 changes. FIG. 4 shows only the positional relationship between the power transmitting coils 13 and 14 and the power receiving coil 22, and does not show the housings and other components of the power transmitter 10 and the power receiver 20.

As noted above, the position of the power receiving coil 22 varies in the direction of an arrow Y depending on the respective cases such as when the power receiver 20 is directly placed on the power transmitter 10, and when the power receiver 20 is placed on the power transmitter 10 while housed in a case. Shown herein is an example in which the position of the power receiving coil 22 with respect to the power transmitting coils 13 and 14 varies to positions P1, P2, and P3, producing changes in the relative distance between the power receiving coil 22 and the power transmitting coils 13 and 14.

Initially, attention is focused on a portion where the power receiving coil 22 is opposed to the power transmitting coil 13 with reference to FIG. 4. At the position P1, the distance between the power transmitting coil 13 and the power receiving coil 22 (vertical direction) is H1 as the shortest distance in the corresponding distances of the positions P1 through P3. The area of the power receiving coil 22 opposed to the power transmitting coil 13 is J1×m, assuming that the length of the power receiving coil 22 opposed to the power transmitting coil 13 is J1, and that the width of the power receiving coil 22 is m (see FIG. 2B).

Similarly, at the positions P2 and P3, the distances between the power transmitting coil 13 and the power receiving coil 22 (vertical direction) become H2 and H3, respectively. The areas of the power receiving coil 22 opposed to the power transmitting coil 13 become J2×m and J3×m. Assuming that the width m of the power receiving coil 22 is shorter than the width n1 of the power transmitting coil 13 as illustrated in FIGS. 2A and 2B, the following relation (1) is satisfied.

$$H1<H2<H3,\ J1<J2<J3,\ J1\times m<J2\times m<J3\times m \quad (1)$$

Next, attention is shifted to a portion where the power receiving coil 22 is opposed to the power transmitting coil 14. When the power receiving coil 22 is located at the position P1, the distance between the power transmitting coil 14 and the power receiving coil 22 (horizontal direction) is W1 as the shortest distance in the corresponding distances of the positions P1 through P3. The area of the power receiving coil 22 opposed to the power transmitting coil 14 is K1×m assuming that the length of the power receiving coil 22 opposed to the power transmitting coil 14 is K1. Similarly, at the positions P2 and P3, the lengths of the power receiving coil 22 opposed to the power transmitting coil 14 are K2 and K3, the distances between the power transmitting coil 14 and the power receiving coil 22 (horizontal direction) become W2, W3, respectively, and the areas of the power receiving coil 22 opposed to the power transmitting coil 14 are K2×m and K3×m. Assuming that the width m of the power receiving coil 22 is shorter than the width n2 of the power transmitting coil 14 as illustrated in FIGS. 2A and 2B, the following relation (2) is satisfied.

$$W1<W2<W3,\ K1<K2<K3,\ K1\times m<K2\times m<K3\times m \quad (2)$$

FIG. 5A is a table showing the relations discussed above. In FIG. 5A, a distance H indicates the distance between the power transmitting coil 13 and the power receiving coil 22, an opposed area (13-22) indicates the area of the power receiving coil 22 opposed to the power transmitting coil 13, a distance W indicates the distance between the power transmitting coil 14 and the power receiving coil 22, and an opposed area (14-22) indicates the area of the power receiving coil 22 opposed to the power transmitting coil 14.

In general, the coupling coefficient k increases as the distance between the coils becomes shorter and as the opposed area of the coils becomes larger. Accordingly, the table in FIG. 5A can be qualitatively revised into FIG. 5B when the elements increasing the coupling coefficient k and the elements decreasing the coupling coefficient k are expressed as (B) and (C), respectively, based on the reference (A) corresponding to the distance and the opposed area when the receiving coil 22 is located at the position P2.

As shown in FIG. 5B, the coupling coefficient k increases as the distances H and W become shorter as in the case when the power receiving coil 22 is located at the position P1. However, the coupling coefficient k decreases by decrease in the sum of the opposed area (13-22) and the opposed area (14-22) becomes smaller. In this case, the increase in the coupling coefficient k is cancelled by the decrease in the coupling coefficient k, wherefore the coupling coefficient k changes very little regardless of the change in the position of the power receiving coil 22. On the other hand, the coupling coefficient k decreases as the distances H and W become longer as in the case when the power receiving coil 22 is located at the position P3. However, the coupling coefficient k increases by increase in the sum of the opposed area (13-22) and the opposed area (14-22) becomes larger. In this case, the decrease in the coupling coefficient k is cancelled by the increase in the coupling coefficient k, wherefore the coupling coefficient k changes very little regardless of the change in the position of the power receiving coil 22. In other words, when the distances between the power transmitting coils 13 and 14 and the power receiving coil 22 change, the opposed areas of the power transmitting coils 13 and 14 and the power receiving coil 22 vary correspondingly.

Accordingly, in this embodiment, there is provided a power transmission device whose coupling coefficient k varies very little even when the position of the power receiving coil 22 changes to the positions P1 through P3 with respect to the power transmitting coils 13 and 14 as illustrated in FIG. 4.

Figure 6:
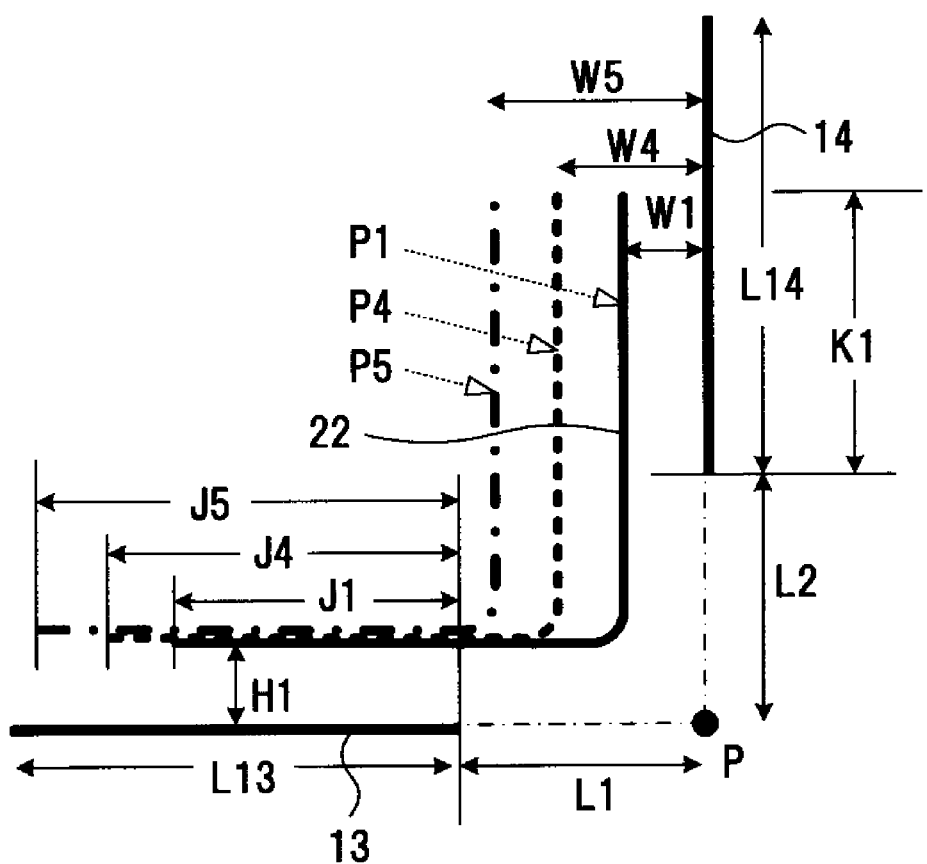
FIG. 6 also illustrates coupling coefficient changes in response to positional change in the power transmitting coils and the power receiving coil according to the first embodiment.

Explained herein is the change in the coupling coefficient k when the power receiving coil 22 is shifted in the horizontal direction along the power transmitting coil 13 as illustrated in FIG. 6. It is assumed that the distance H1 (vertical direction) between the power receiving coil 22 and the power transmitting coil 13 is fixed.

FIG. 7A shows the distance H between the power transmitting coil 13 and the power receiving coil 22, the opposed area (13-22) of the power receiving coil 22 opposed to the power transmitting coil 13, the distance W between the power transmitting coil 14 and the power receiving coil 22, and the opposed area (14-22) of the power receiving coil 22 opposed to the power transmitting coil 14 when the power receiving coil 22 is shifted along the power transmitting coil 13 toward positions P4 and P5 from the position P1 where the power receiving coil 22 is closest to the power transmitting coils 13 and 14. The position P1 of the power receiving coil is identical to the position P1 shown in FIG. 4.

The power receiving coil 22 is shifted in the direction away from the intersection P along the power transmitting coil 13. In this case, the distance H is fixed to H1, while the opposed area (14-22) is fixed to K1×m. Thus, variable parameters are the opposed area (13-22) and the distance W, wherefore the following relation (3) is satisfied.

$$J1<J4<J5,\ W1<W4<W5,\ J1\times m<J4\times m<J5\times m \quad (3)$$

FIG. 7A can be revised into FIG. 7B according to the relation (3) when the elements increasing the coupling coefficient k and the elements decreasing the coupling coefficient k are expressed as (B) and (C), respectively, based on the reference (A) corresponding to the distances H and W and the opposed areas (13-22, 14-22) when the receiving coil 22 is located at the position P4.

As shown in FIG. 7B, the coupling coefficient k decreases as the opposed area (13-22) becomes smaller as in the case when the power receiving coil 22 is located at the point P1. However, the coupling coefficient k increases by decrease in the distance W. In this case, the decrease in the coupling coefficient k is cancelled by the increase in the coupling coefficient k, wherefore the coupling coefficient k changes very little regardless of the change in the position of the power receiving coil 22. On the other hand, the coupling coefficient k increases as the opposed area (13-22) becomes larger as in the case when the power receiving coil 22 is located at the position P5. However, the coupling coefficient k decreases by increase in distance W. In this case, the increase in the coupling coefficient k is cancelled by the decrease in the coupling coefficient k, wherefore the coupling coefficient k changes very little regardless of the change in the position of the power receiving coil 22.

Accordingly, in this embodiment, there is provided a power transmission device whose coupling coefficient k varies very little even when the position of the power receiving coil 22 changes to the positions P1, P4, and P5 with respect to the power transmitting coils 13 and 14 as illustrated in FIG. 6.

In a similar manner, the coupling coefficient k increases as the distance H becomes shorter in the case of shift of the power receiving coil 22 in the vertical direction. In this case, however, the opposed area (14-22) becomes smaller. Thus, the increase in the coupling coefficient k is cancelled, wherefore the coupling coefficient k varies very little regardless of the change in the position of the power receiving coil 22. On the other hand, the coupling coefficient k decreases as the distance H becomes longer. However, the coupling coefficient k increases by increase in the opposed area (14-22). Thus, the decrease in the coupling coefficient k is cancelled by the increase in the coupling coefficient k, wherefore the coupling coefficient k varies very little regardless of the change in the position of the power receiving coil 22.

Accordingly, according to the first embodiment, there is provided a power transmission device whose coupling coefficient k varies very little even when the position of the power receiving coil 22 shifts both in the horizontal and vertical directions, or only in either the horizontal or the vertical direction with respect to the power transmitting coils 13 and 14.

Explained herein with reference to FIGS. 8 through 11 is a practical measurement and comparison between the coupling coefficient k of related art, and the coupling coefficient k of the power transmission device according to this embodiment.

Figure 8A:
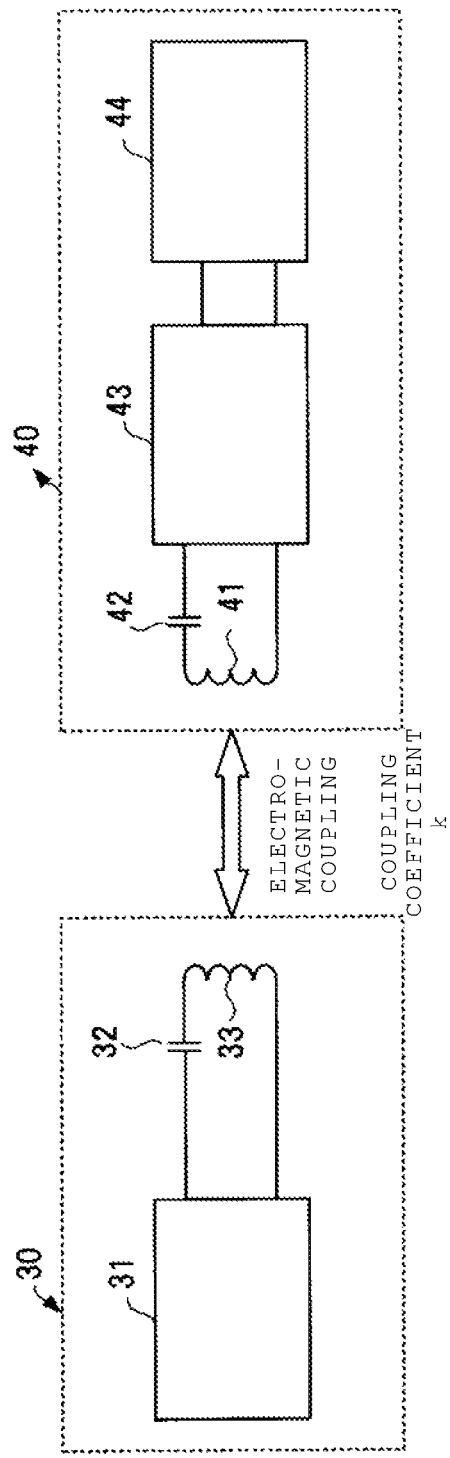

FIG. 8A illustrates the structure of a conventional power transmission device performing contactless power transmission. A power transmitter 30 includes an alternating current power source 31, a resonance capacitor 32, a power transmitting coil 33, and other components. A power receiver 40 includes a power receiving coil 41, a resonance capacitor 42, a rectification circuit 43, a load circuit 44, and other components. FIG. 8B shows an example of the power transmitting coil 33 and the power receiving coil 41, where the flat-plate-shaped power transmitting coil 33 and power receiving coil 41 are disposed opposed to each other, for example.

The coupling coefficient k can be calculated from an equation (4) based on practical measurement of self-inductance Lopen and leakage inductance Lsc.

$$k = \sqrt{1 - \frac{Lsc}{Lopen}} \quad (4)$$

Figure 9:
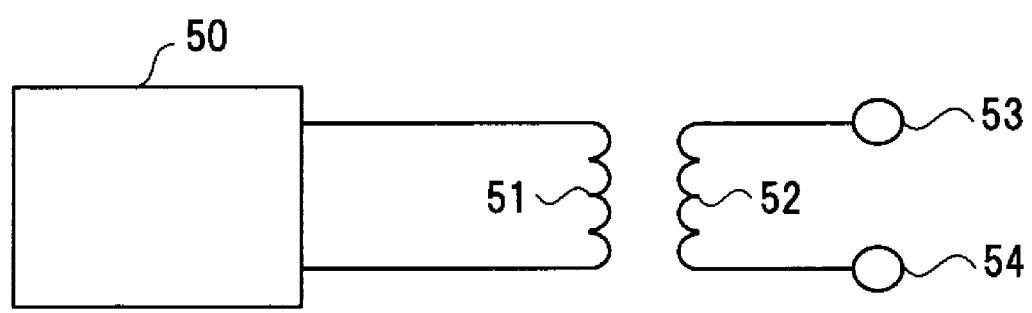
FIG. 9 illustrates a measuring system which measures a coupling coefficient of the power transmission device according to the first embodiment.

FIG. 9 illustrates a measuring system which measures the coupling coefficient k of the power transmission device. As illustrated in FIG. 9, a measuring device 50 such as an LCR meter, to which a coil 51 is connected, measures the self-inductance Lopen produced when both ends 53 and 54 of a coil 52 as the opposite coil of the coil 51 are opened, and the leakage inductance Lsc produced when both the ends 53 and are short-circuited. The coupling coefficient k is calculated from the equation (4) based on the self-inductance Lopen and the leakage inductance Lsc thus measured.

Figure 10:
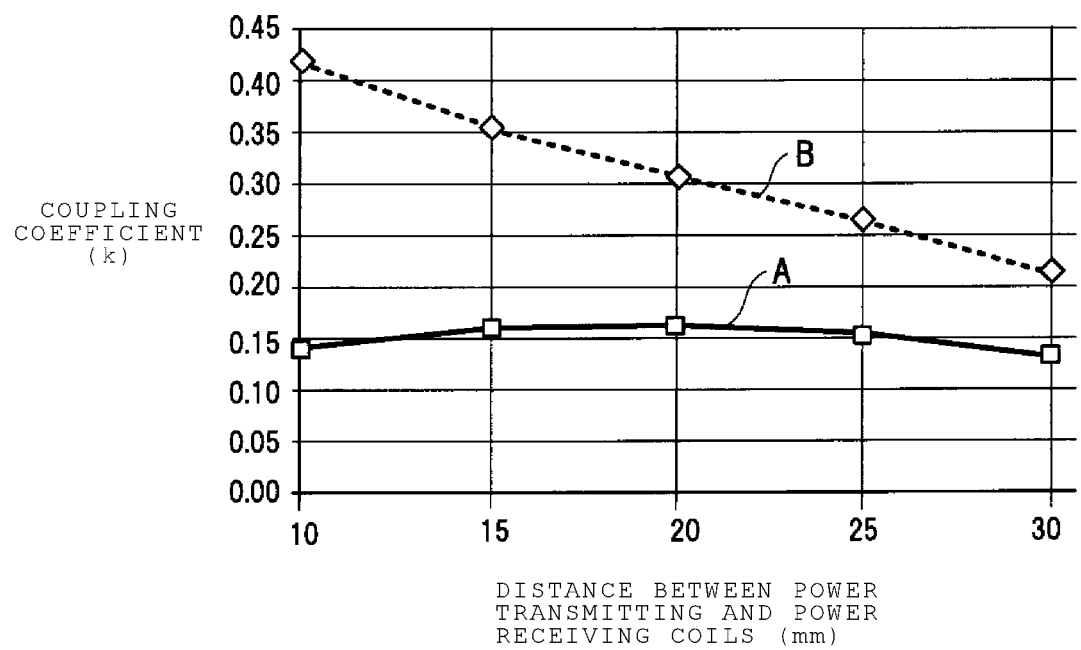
FIG. 10 shows characteristics of the relationship between the distance between the power transmitting and receiving coils and the coupling coefficient according to the first embodiment and a comparative example.

A dotted line B in FIG. 10 shows a measurement result of the coupling coefficient k obtained when the distance between the flat-plate-shaped power transmitting coil 33 and power receiving coil 41 shown in FIG. 8B, i.e., the distance between the power transmitting and receiving coils is changed. In this case, each size of the power transmitting coil 33 and the power receiving coil 41 used herein is determined such that the size of the external shape of a spiral coil pattern is approximately 100 mm in diameter. The inductance measured at 100 kHz is approximately 2.5 μH.

The coupling coefficient k is 0.42 when the distance between the power transmitting and receiving coils is 10 mm. This coupling coefficient k decreases as the distance between the power transmitting and receiving coils becomes longer, and drops to 0.21 when the distance between the power transmitting and receiving coils is 30 mm. The coupling coefficient k varies in the range of 0.315±33% when the distance between the power transmitting and receiving coils lies in the range from 10 mm to 30 mm. It is considered as a quite common result that the coupling coefficient k varies in the range of ±33% by the change in the distance between the power transmitting and receiving coils by approximately 20 mm (corresponding to 20% of the length of the diameter of the coils) in view of the ratio (20%) of the diameter of the coils (100 mm) and the distance between the power transmitting and receiving coils (20 mm).

On the other hand, a solid line A in FIG. 10 shows a result of measurement of the variations in the coupling coefficient k produced at the time of use of the power transmitting coils 13 and 14 and the power receiving coil 22 of the power transmission device according to the first embodiment. Each of the power transmitting coils 13 and 14 has the shape shown in FIG. 2A, and has a coil formed by a copper line, for example. The external shape of the spiral coil pattern of each of the power transmitting coils 13 and 14 has a size of approximately 120 mm×70 mm, and the coil width of n1=n2=120 mm. The inductance measured at 100 kH is approximately 1.25 μH for each, producing the sum of the inductance of approximately 2.5 μH by series connection of the power transmitting coil 13 and the power transmitting coil 14.

The power receiving coil 22 has the shape shown in FIG. 2B. The external shape of the spiral coil pattern has a size of approximately 100 mm×100 mm when the power receiving coil 22 is in the condition of a flat surface. The power receiving coil 22 having this shape is bent substantially at right angles such that one surface thereof has a size of approximately 50 mm×100 mm. The bent portion 29 has an appropriate R shape (circular-arc shape). The power receiving coil 22 is also formed by a copper line, for example. The width m of the power receiving coil 22 shown in FIG. 2B is 100 mm. The cross-sectional view of the arrangement of the power transmitting coils 13 and 14 are shown in FIG. 3. In this case, each of the distances L1 and L2 from the intersection P where the surfaces 17 and 18 cross each other is set to approximately 20 mm. Each of lengths L13 and L14 of the power transmitting coil 13 and the power transmitting coil 14 is set to 70 mm.

For simplification, the shift direction of the power receiving coil 22 is determined only in the Y direction shown in FIG. 4, while the distance H between the power receiving coil 22 and the power transmitting coil 13 is set equal to the distance W between the power receiving coil 22 and the power transmitting coil 14. Accordingly, conditions are determined such that each of the distances H and W is 10 mm when the distance between the power transmitting and receiving coils is 10 mm, and that each of the distances H and W is 30 mm when the distance between the power transmitting and receiving coils is 30 mm, for example.

As can be seen from the result indicated by the solid line A in FIG. 10, according to the structure in this embodiment, the coupling coefficient k varies only within the range from 0.13 to 0.16 even when the distance between the power transmitting and receiving coils changes in the range from 10 mm to 30 mm. In this case, the coupling coefficient varies in the range of 0.145±10%. Accordingly, the rate of change in the coupling coefficient k is approximately ⅓ of that of the characteristics B in the related art, showing a considerable decrease in the rate of change in the coupling coefficient k.

Figure 11:
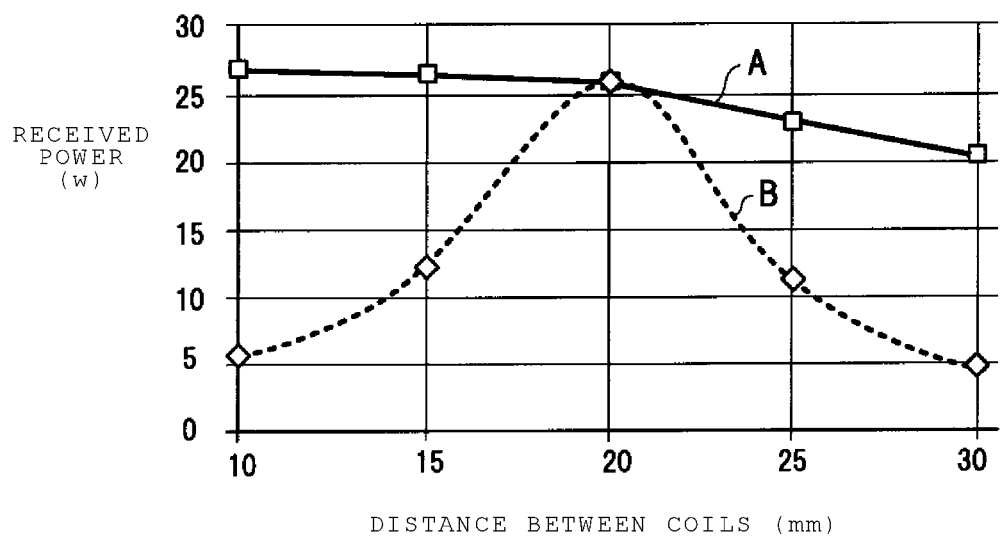
FIG. 11 shows characteristics of the relationship between the distance between the power transmitting and receiving coils and the received power according to the first embodiment and the comparative example.

Described herein in conjunction with FIG. 11 is how the power allowed to be received by the power receiver 20 or 40 varies when the coupling coefficient k changes in accordance with the change in the distance between the coils as shown in FIG. 10.

The power allowed to be received in this context refers to power received by the power receiver 20 or 40 from the power transmitter 10 or 30 through contactless transmission and rectified by the rectification circuit 24 or 43 with conversion from alternating current to direct current. The received power is measured by using a measuring device such as an electronic load in place of the load circuit 25 or 44. During measurement, the voltage supplied from the outside to the alternating current power source 11 or 31 within the transmitter 10 or 30 is a fixed voltage such as direct current 24V to be applied.

A dotted line B in FIG. 11 is a measurement result obtained by the related-art structure (FIGS. 8A and 8B). As can be seen from the result shown in FIG. 11, the received power becomes the maximum of 26 W when the distance between the coils is 20 mm. However, the received power rapidly drops as the distance between the coils decreases to a distance shorter than 20 mm, or increases to a distance longer than 20 mm. When the distance between the coils becomes 10 mm or 30 mm, the received power is only about 5 W. Though not shown in the figure, the power transmission efficiency similarly becomes the maximum when the distance between the coils is 20 mm. The power transmission efficiency tends to considerably drop as the distance between the coils shifts from 20 mm.

In other words, when the distance between the coils changes by ±10 mm from 20 mm, the received power drops to approximately 20% of the received power when the distance between the coils is 20 mm. When power of 20 W is required for operating the load circuit 44, for example, the distance between the coils needs to fall within an extremely narrow range of ±2.5 mm from 20 mm.

On the other hand, a solid line A in FIG. 11 indicates a measurement result of the structure of the power transmission device according to this embodiment. As can be seen from the figure, power in the range of about 20 W to 27 W can be obtained when the distance between the coils lies in the range from 10 mm to 30 mm. In other words, even when the distance between the coils changes in the range of ±10 mm from 20 mm, the received power varies only in the range from 104% to 77% of the received power obtained when the distance between the coils is 20 mm. When compared with the characteristics B in the related art, the variation of the received power in response to the change in the distance between the coils exhibits considerably smooth characteristics. Though not shown in the figure, the power transmission efficiency changes very little when the distance between the coils lies in the range of ±10 mm from 20 mm similarly to the received power.

The characteristics A in FIG. 11 are produced by the characteristics that the coupling coefficient k changes very little regardless of the change in the distance between the coils as shown by the characteristics A in FIG. 10. The received power tends to more or less drop as the distance between the coils increases. However, the rate of the drop is extremely small, and received power of 20 W or larger can be obtained when the distance between the coils is in the range from 10 mm to 30 mm. Thus, when power of 20 W is required for operation of the load circuit 25, for example, the allowable distance between the coils for use ranges from 10 mm to 30 mm. Accordingly, considerable improvement is achieved when compared with the related art which is allowed only in the range of ±2.5 mm for use.

Moreover, highly stable power receiving characteristics for the change in the distance between the coils can be obtained which are not expected in the related art without the use of a control circuit capable of changing a circuit constant in accordance with the change in the coupling coefficient k. Simultaneously, high power transmission efficiency is allowed to be maintained.

The embodiment discussed herein shows the example which connects the power transmitting coil 13 and the power transmitting coil 14 in series. Assuming that the inductance necessary for resonance of the resonance element 15 shown in FIG. 1A is L, the inductance necessary for the power transmitting coil 13 and the power transmitting coil 14 is only L/2 for each when the respective coils are connected in series. However, the inductance is not limited to L/2 for each, but may be arbitrarily determined as long as the sum of the inductances of the power transmitting coil 13 and the power transmitting coil 14 becomes L.

Figure 12:
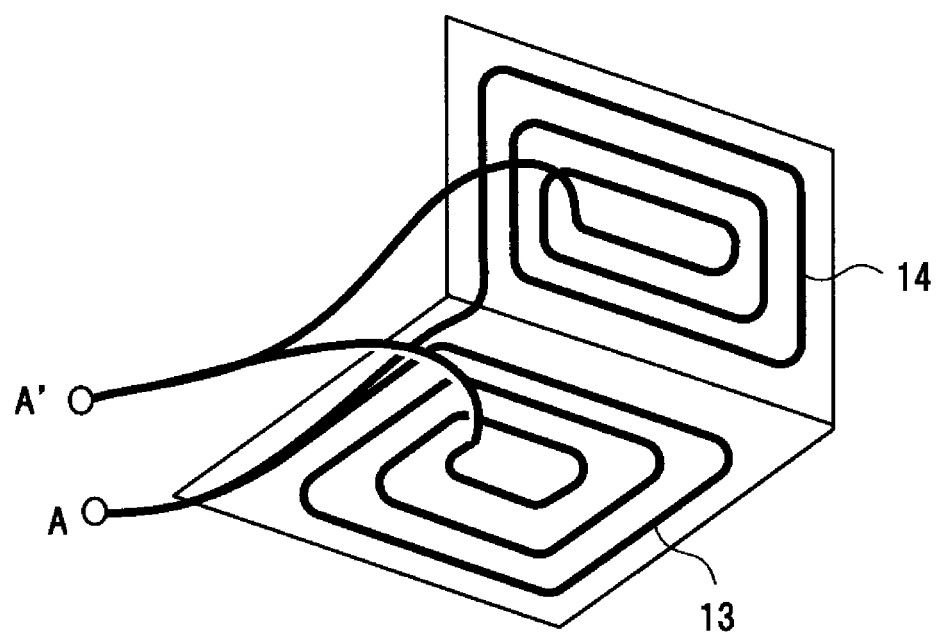
FIG. 12 is a perspective view illustrating power transmitting coils according to a modified example of the first embodiment.

FIG. 12 illustrates an example which connects the power transmitting coil 13 and the power transmitting coil 14 in parallel. Even when the power transmitting coil 13 and the power transmitting coil 14 are connected in parallel, the characteristics that the coupling coefficient k does not easily change by the change in the distance between the coils are obtained similarly to the case of series connection. However, for allowing the inductance as viewed from the terminal A in FIG. 1A to become the inductance L similar to the inductance L in the case of series connection, the sum of the inductances of the power transmitting coil 13 and the power transmitting coil 14 needs to be four times as large as the inductance for series connection (2 L for each of the power transmitting coil 13 and the power transmitting coil 14). Thus, the structure which connects the power transmitting coil 13 and the power transmitting coil 14 in series is more advantageous in view of reduction of the number of winding of the coils.

Figure 13A:
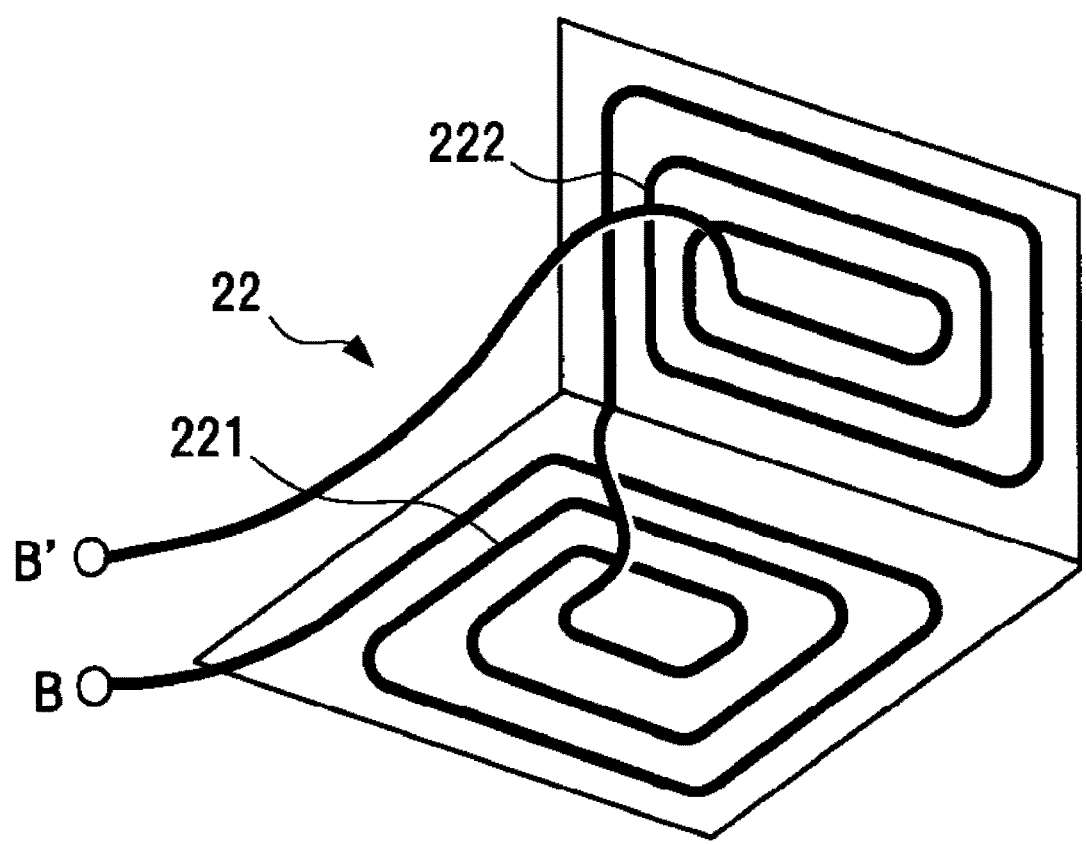
FIGS. 13A and 13B are perspective views illustrating power receiving coils according to a modified example of the first embodiment.
Figure 13B:
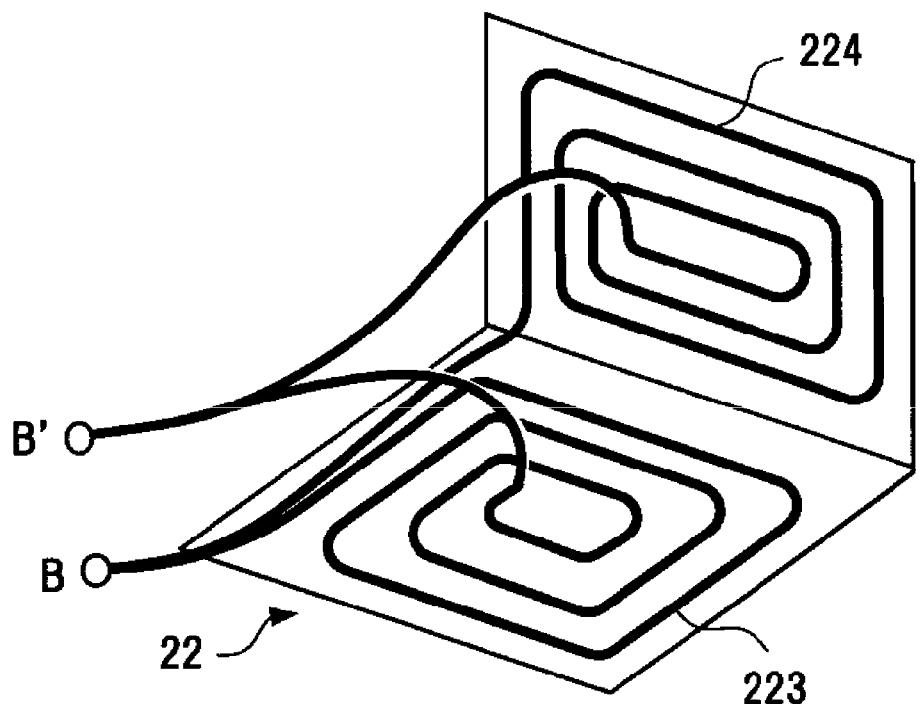

On the other hand, such a structure for the power receiving coil 22 is allowed which connects two coils in series or in parallel to form a structure shown in FIGS. 13A and 13B, for example, in place of the shape produced by folding one coil as illustrated in FIG. 2B.

FIG. 13A shows an example which connects two coils 221 and 222 in series to form the power receiving coil 22. FIG. 13B shows an example which connects two coils 223 and 224 in parallel to form the power receiving coil 22. Each of the structures shown in FIGS. 13A and 13B adjusts the inductance of each coil and the value of the resonance capacitor 21 such that the self-resonance frequency of the resonance element 23 composed of the resonance capacitor 21 shown in FIG. 1A and the power receiving coils 221 and 222 (or 223 and 224) becomes substantially equivalent to the self-resonance frequency of the resonance element 15 for power transmission.

Figure 14:
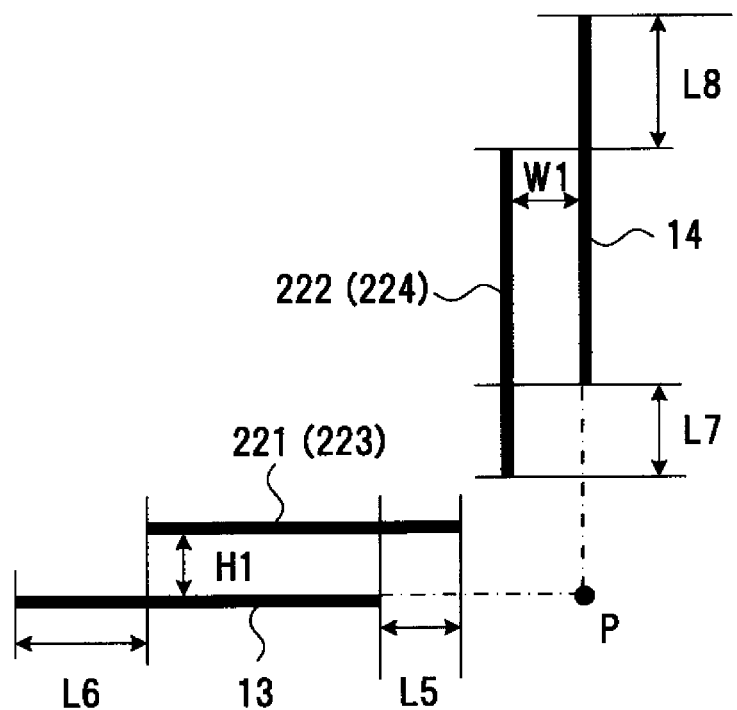
FIG. 14 is a cross-sectional view illustrating the positional relationship between the power transmitting coils and the power receiving coils according to the modified example of the first embodiment.

FIG. 14 illustrates the positional relationship between two coils connected in series or in parallel with each other to constitute the power receiving coil 22, and the power transmitting coils 13 and 14. The positional relationship shown in FIG. 14 is basically similar to the relationship shown in FIG. 3. According to the structure in FIG. 14, the power receiving coil 221 (or 223) opposed to the power transmitting coil 13 is shifted toward the intersection P in such a position as to be offset from the power transmitting coil 13 by distances L5 and L6 under the condition in which the power receiving coils 221 and 222 (or 223 and 224) come closest to the power transmitting coils 13 and 14.

On the other hand, the power receiving coil 222 (or 224) opposed to the power transmitting coil 14 is shifted toward the intersection P in such a position as to be offset from the power transmitting coil 14 by distances L7 and L8. This arrangement of the power transmitting coils and the power receiving coils as illustrated in FIG. 14 can produce such characteristics that the coupling coefficient k does not easily vary by the change in the distance between the coils.

Explained herein are restrictions imposed on the winding method or the connection method of the power transmitting coils 13 and 14 and the power receiving coil 22 of the power transmission device.

Figure 15:
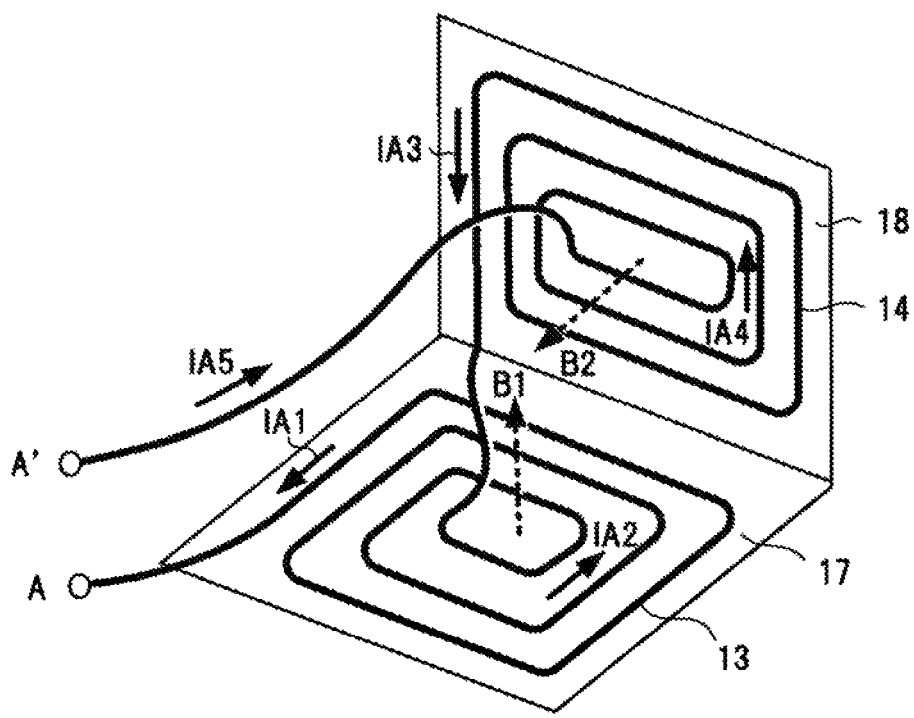
FIG. 15 is an illustration of the directions of magnetic fields and current generated in the power transmitting coils and the power receiving coil according to the first embodiment.
Figure 15:
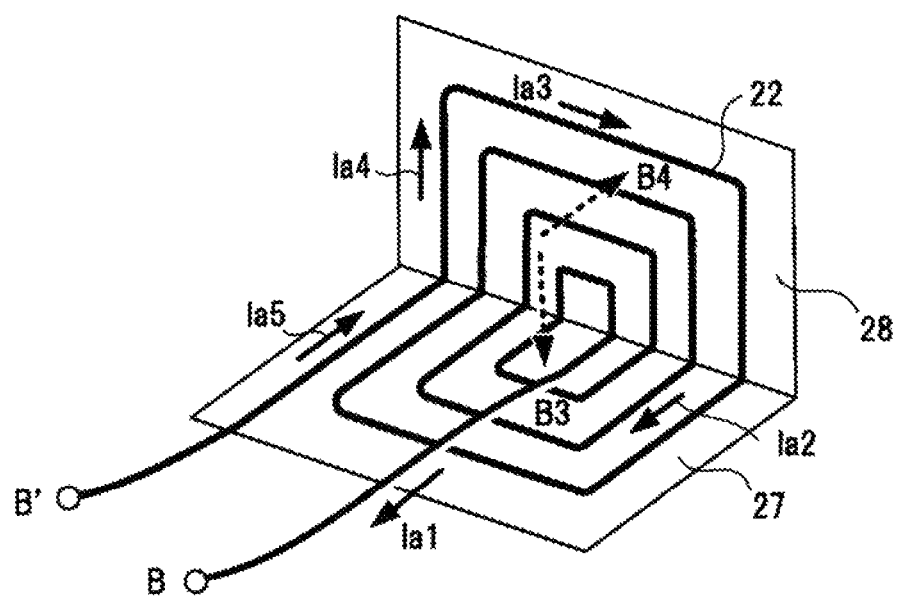

FIG. 15 shows the directions of the magnetic field and the current generated in each of the power transmitting coils and 14 and the power receiving coil 22. The power transmitting coils 13 and 14 are connected in series, where the inner circumferential end of the power transmitting coil 13 is connected with the outer circumferential end of the power transmitting coil 14. The power transmitting coils 13 and 14 receive supply of alternating current, wherefore the direction of the current changes with time. Thus, the operation discussed herein is only an action at a certain instant.

Current is supplied from the alternating current power source 11 in the direction of arrows IA1 through IA5 at a certain time. A magnetic field in the direction indicated by an arrow B1 is generated in the power transmitting coil 13 by the current flowing in the power transmitting coil 13 in the direction of IA1 and IA2. On the other hand, a magnetic field in the direction indicated by an arrow B2 is generated in the power transmitting coil 14 by the current flowing in the power transmitting coil 14 in the direction of IA3 and IA4.

As illustrated in FIG. 3, power is transmitted with the power receiving coil 22 overlapped on the power transmitting coils 13 and 14. In this case, magnetic fields indicated by B3 and B4 are generated in the power receiving coil 22 in the directions opposite to the directions of the magnetic fields B1 and B2 generated in the power transmitting coils 13 and 14 by the effect of electromagnetic coupling. As a result, current flows in the power receiving coil 22 in the direction indicated by arrows Ia1 through Ia5. The current Ia1 through Ia5 is unidirectional as viewed from the ends B and B', and does not flow in directions canceling each other.

Accordingly, by determining the settings while considering the winding directions of the power transmitting coils 13 and 14 or the flowing direction of the current such that the current generated in the power receiving coil 22 becomes unidirectional, power is allowed to be extracted via the power receiving coil 22. In other words, the winding directions and the connection method of the power transmitting coils 13 and 14 are determined such that both of the magnetic fields generated at a certain time by the current flowing in the power transmitting coils 13 and 14 agree with the directions from the power transmitting coils 13 and 14 toward the power receiving coil 22, that is, the directions of the magnetic fields indicated by B1 and B2.

The current flowing in the power transmitting coils 13 and 14 is alternating current. In this case, the current flows in the opposite direction at another time. Accordingly, the directions of the magnetic fields generated from the power transmitting coils 13 and 14 by the current flowing in the power transmitting coils 13 and 14 become opposite to the directions of the magnetic fields B1 and B2 shown in FIG. 15. However, in the configuration of FIG. 15, it is not possible for the direction of only one of the magnetic fields B1 and B2 to be generated in the opposite direction.

Figure 16:
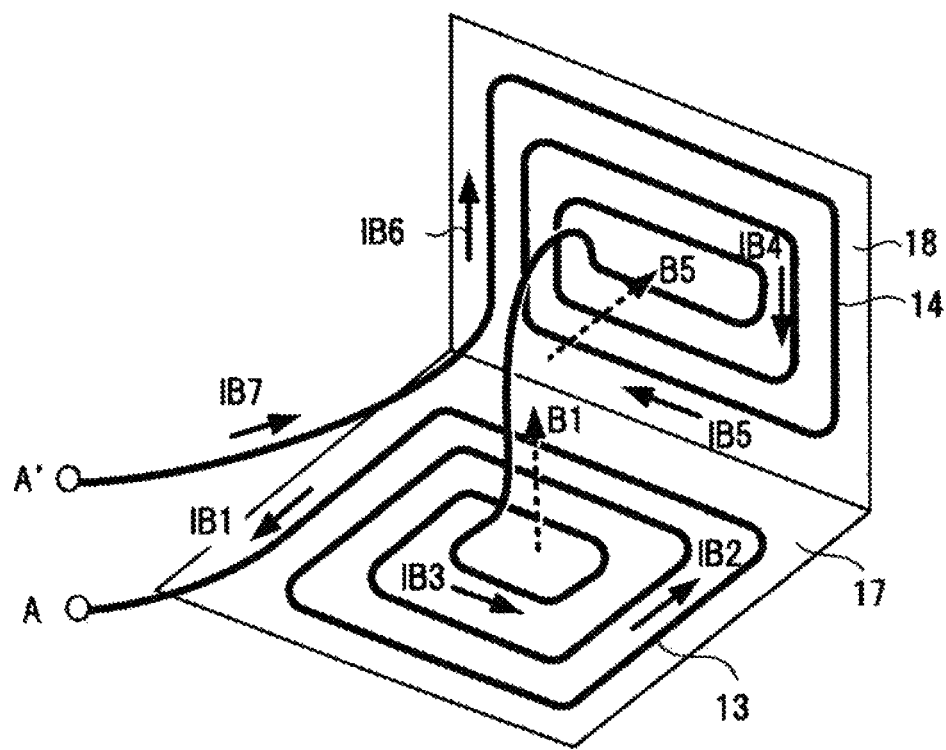
FIG. 16 is an illustration of the directions of magnetic fields and current generated in the power transmitting coils and the power receiving coil according to a comparative example.
Figure 16:
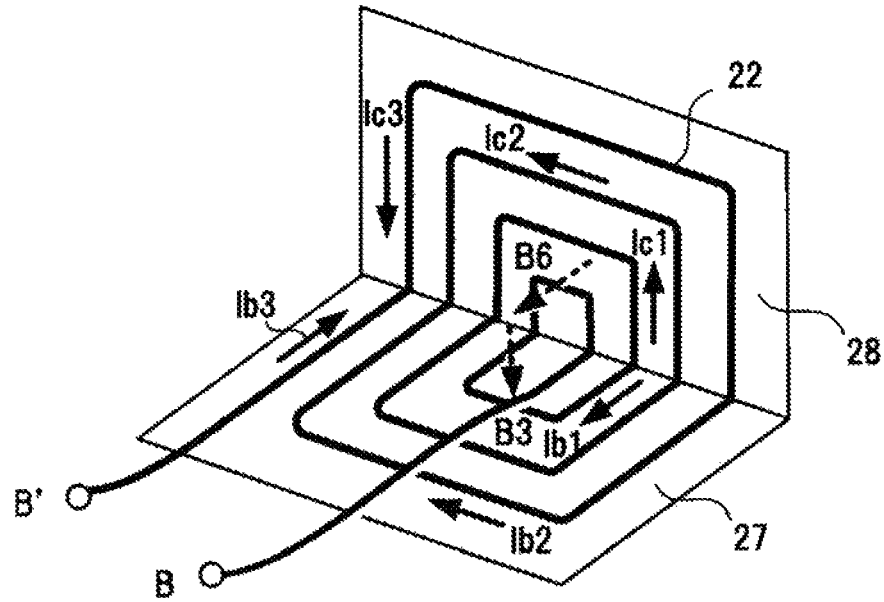

FIG. 16 illustrates an example from which power cannot be extracted via the power receiving coil 22. In FIG. 16, the power transmitting coils 13 and 14 are connected in series, where the inner circumferential end of the power transmitting coil 13 is connected with the inner circumferential end of the power transmitting coil 14. As can be seen from FIG. 16, the direction of the current flowing in the power transmitting coil 14 is opposite to the direction of the example shown in FIG. 15. More specifically, the direction of the current flowing in the power transmitting coil 13 as indicated by IB1 through IB3 is the same as the direction of the current IA1 and IA5 shown in FIG. 15, while the direction of the current flowing in the power transmitting coil 14 as indicated by IB4 through IB6 is opposite to the direction of the current IA3 and IA4 flowing in the power transmitting coil 14 shown in FIG. 15.

Accordingly, the direction of the magnetic field B1 generated in the power transmitting coil 13 by the current in the direction of IB1 through IB3 is the same as the direction of the example shown in FIG. 15, while the direction of a magnetic field B5 generated in the power transmitting coil 14 by the current flowing in the direction of IB4 through IB6 is opposite to the direction of the example shown in FIG. 15 (magnetic field B2).

In power transmission with the power receiving coil 22 overlapped with the power transmitting coils 13 and 14, the magnetic field B3 is generated in the power receiving coil 22 in the direction from the power receiving coil 22 toward the power transmitting coil 13 by the effect of electromagnetic coupling in such a direction as to cancel the magnetic fields generated by the power transmitting coils 13 and 14. In this case, current is generated to flow in the direction of Ib1 through Ib3. Simultaneously, a magnetic field B6 is generated in the direction from the power transmitting coil 14 toward the power receiving coil 22, whereby current is generated to flow in the direction of Ic1 through Ic3. However, the directions of the current Ib1 through Ib3 and the current Ic1 through Ic3 generated in the power receiving coil 22 are the opposite directions, wherefore the two directions are canceled by each other. In this case, power cannot be extracted from the ends B and B'.

Therefore, in the case of the structure which forms the power receiving coil 22 by a single coil, it is necessary to supply current to the power transmitting coils 13 and 14 such that the directions of the magnetic fields generated from the power transmitting coils 13 and 14 at a certain time have the directions from the power transmitting coils 13 and 14 toward the side where the power receiving coil 22 is placed, that is, the directions of the magnetic fields B1 and B2, and at another time have the directions opposite to the directions of the magnetic fields B1 and B2. Accordingly, the winding method of the power transmitting coils 13 and 14, or the connection method of the power transmitting coils 13 and 14 needs to be determined so as to produce this condition.

On the other hand, when the power receiving coil 22 includes the two coils 221 and 222 (or 223 and 224) connected with each other as illustrated in FIGS. 13A and 13B, it is necessary to change the directions or the connection method of the power receiving coils 221 and 222 (or 223 and 224) such that power can be extracted from the power receiving coil 22.

Figure 17:
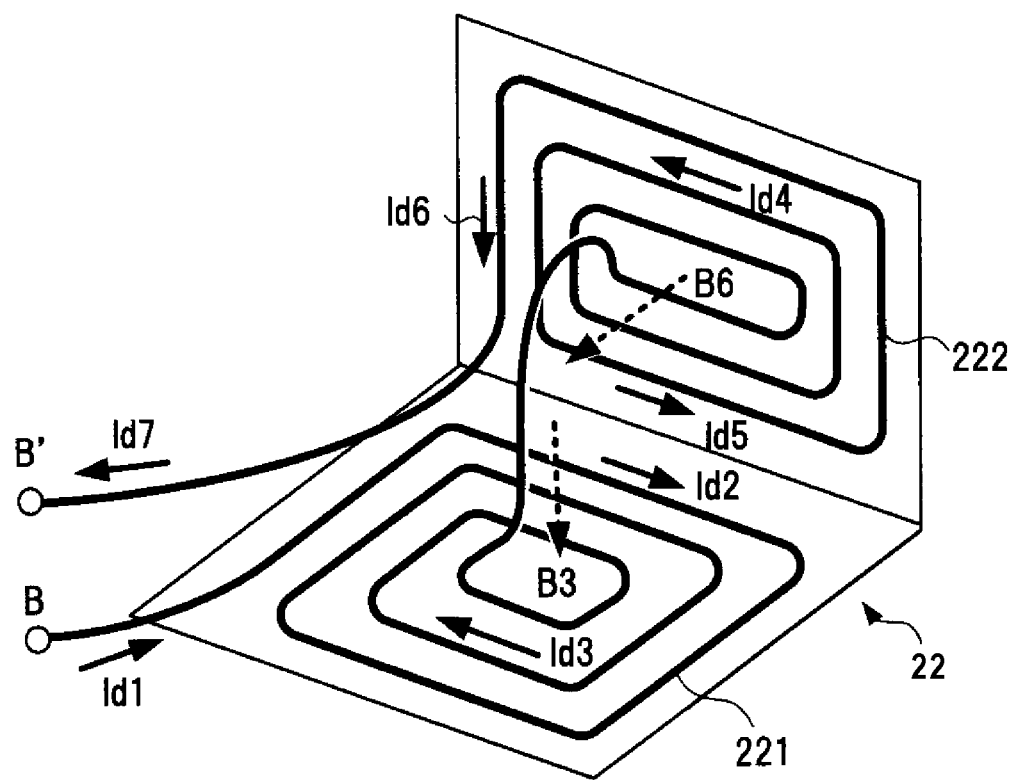
FIG. 17 illustrates the directions of magnetic fields and current generated in the power receiving coils according to a modified example of the first embodiment.

FIG. 17 illustrates an example which uses the two coils 221 and 222 constituting the power receiving coil 22. According to this structure, the power receiving coil 221 and 222 are connected in series, where the inner circumferential end of the coil 221 is connected with the inner circumferential end of the coil 222. Assuming that the magnetic fields B1 and B5 as illustrated in FIG. 16 are generated in the power transmitting coils 13 and 14, the magnetic fields B3 and B6 are generated by electromagnetic coupling, in which condition current flows in the direction of Id1 through Id7. In this case, the current generated in the power receiving coils 221 and 222 is unidirectional and does not flow in directions cancelling each other. Thus, received power can be extracted via the ends B and B'.

There are several options for coil winding direction and connection method of the power receiving coils 221 and 222. An important factor to be taken into consideration in determining these direction and method is to avoid flow of the current in the power receiving coils in directions cancelling each other when the current is generated by the magnetic fields generated by the power transmitting coils 13 and 14.

Figure 18:
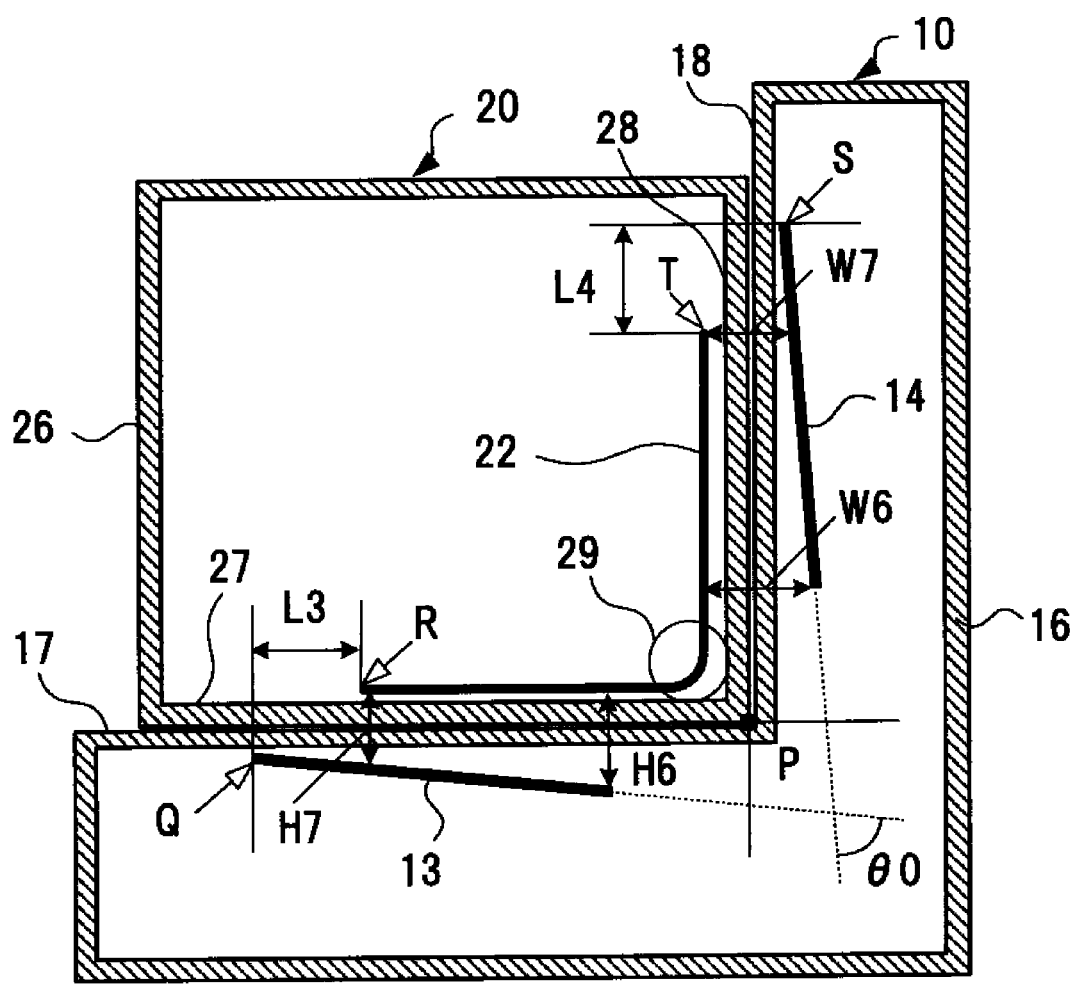
FIG. 18 is a cross-sectional view illustrating the arrangement of the power transmitting coils and the power receiving coil according to a modified example of the first embodiment.

While the arrangement discussed herein with reference to FIG. 3 is the example which disposes the power transmitting coil 13 and the power transmitting coil 14 within the housing 16 inside with respect to the surfaces 17 and 18, such an arrangement illustrated in FIG. 18 is allowed.

FIG. 18 shows an example which disposes the power transmitting coil 13 and the power transmitting coil 14 within the housing 16 in such a condition that the coils 13 and 14 are inclined to the surfaces 17 and 18. As can be seen from this arrangement, the distance between the power transmitting coil 13 and the power receiving coil 22 opposed to the power transmitting coil 13 is not required to be uniform. For example, assuming that the distance between the power transmitting coil 13 and the power receiving coil 22 in an area close to the intersection P of the surface 17 and the surface 18 is H6, and that the distance between the power transmitting coil 13 and the power receiving coil 22 in an area away from the intersection P is H7, the distances H6 and H7 are determined such that H6>H7 holds. In other words, the power transmitting coil 13 is disposed such that the distance between the power transmitting coil 13 and the power receiving coil 22 increases in the direction toward the intersection P.

Similarly, the distance between the power transmitting coil 14 and the power receiving coil 22 opposed to the power transmitting coil 14 is not required to be uniform. For example, assuming that the distance between the power transmitting coil 14 and the power receiving coil 22 in an area close to the intersection P is W6, and that the distance between the power transmitting coil 14 and the power receiving coil 22 in an area away from the intersection P is W7, the distances W6 and W7 are determined such that W6>W7 holds. In other words, the power transmitting coil 14 is disposed such that the distance between the power transmitting coil 14 and the power receiving coil 22 increases in the direction toward the intersection P.

In addition, the power transmitting coils 13 and 14 are disposed such that the ends Q and S of the power transmitting coils 13 and 14 on the sides away from the intersection P are located outside with respect to the ends R and T of the power receiving coil 22, that is, at positions away from the intersection P. In this case, a relative angle θ0 formed by the power transmitting coil 13 and the power transmitting coil 14 becomes smaller than 90 degrees.

When the power transmitting coils 13 and 14 are disposed as illustrated in FIG. 18, in this embodiment, there is provided a power transmission device whose coupling coefficient k does not easily varies even when the distance between the power transmitting coils 13 and 14 and the power receiving coil 22 changes.

FIG. 18 shows the example which disposes the power transmitting coil 13 and the power transmitting coil 14 such that both the coils 13 and 14 are inclined to the power receiving coil 22. However, such an arrangement is allowed which disposes the power transmitting coils 13 and 14 such that only one of the coils 13 and 14 is inclined, with the other being disposed substantially in parallel with the power receiving coil 22.

(Second Embodiment)

A second embodiment changes the shape of the housing of the transmitter 10. According to the structure which places the power receiver 20 on the power transmitter 10, the appropriate coupling coefficient k can be obtained when the power receiver 20 is placed at a proper position. As a result, normal power transmission can be performed (see FIG. 3).

Figure 19:
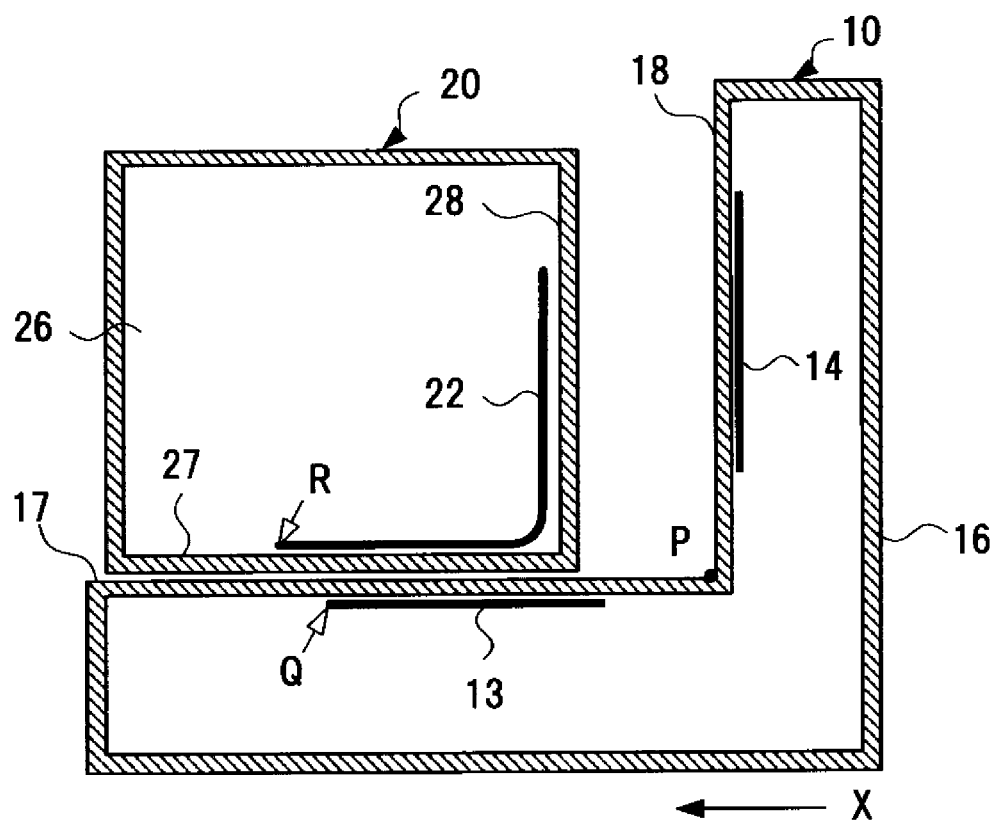
FIG. 19 is a cross-sectional view illustrating the positional relationship between the power transmitting coils and the power receiving coil according to another example of the first embodiment.

However, it occurs in some cases that the position of the power receiver 20 greatly shifts from the proper position with respect to the power transmitter 10. For example, when the power receiver 20 is placed at a position greatly shifted in the X direction as illustrated in FIG. 19, the end R of the power receiving coil 22 along the surface 17 is shifted away from the end Q of the power transmitting coil 13 in the direction opposite to the intersection P. In this case, the areas of the power transmitting coil 13 and the power receiving coil 22 opposed to each other become smaller, whereas the distance between the power transmitting coil 14 and the power receiving coil 22 becomes longer in the direction of separation. Thus, the coupling coefficient k decreases by 20% or more from the appropriate value (about 0.15 in the example of FIG. 10), and consequently the power allowed to be transmitted lowers.

Figure 20:
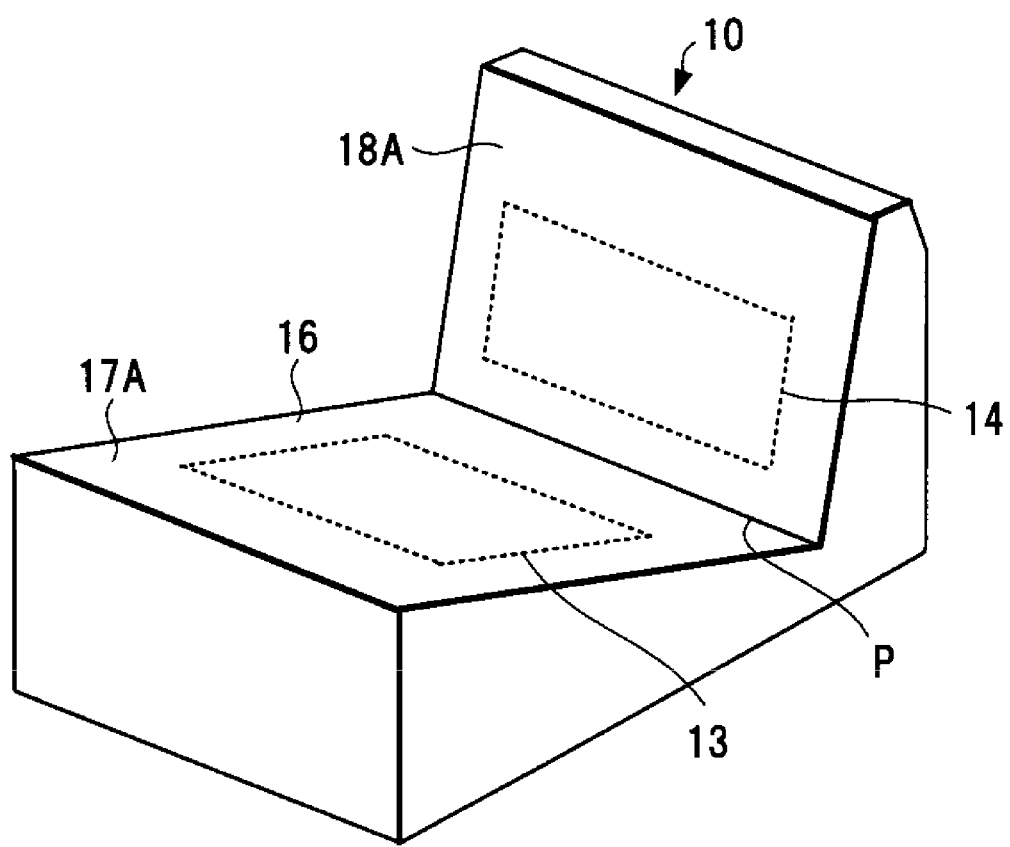
FIG. 20 is a perspective view illustrating a power transmitter of a power transmission device according to a second embodiment.

According to the second embodiment, the structure of the transmitter 10 has a shape shown in FIG. 20 so as to avoid such a condition preventing normal power transmission caused by shift of the power receiver 20 from the proper position.

FIG. 20 is a perspective view illustrating the power transmitter 10 according to the second embodiment. As can be seen from the figure, the angle formed by surfaces 17A and 18A of the housing 16 in the power transmitter 10 is substantially a right angle. In this case, the surface 17A is inclined to the horizontal surface, while the surface 18A is inclined to the vertical surface. The contact area of the surfaces 17A and 18A (area of the intersection P) is located at a low position. The power transmitting coils 13 and 14 are disposed along the surfaces 17A and 18A.

According to this structure, the surface 17A is inclined to the horizontal surface. Therefore, when the power receiver 20 such as a portable device is placed on the power transmitter 10, the power receiver 20 slides along the surface 17A toward the surface 18A by the weight of the power receiver 20. As a result, the power receiver 20 comes into contact with the surface 18A.

Figure 21:
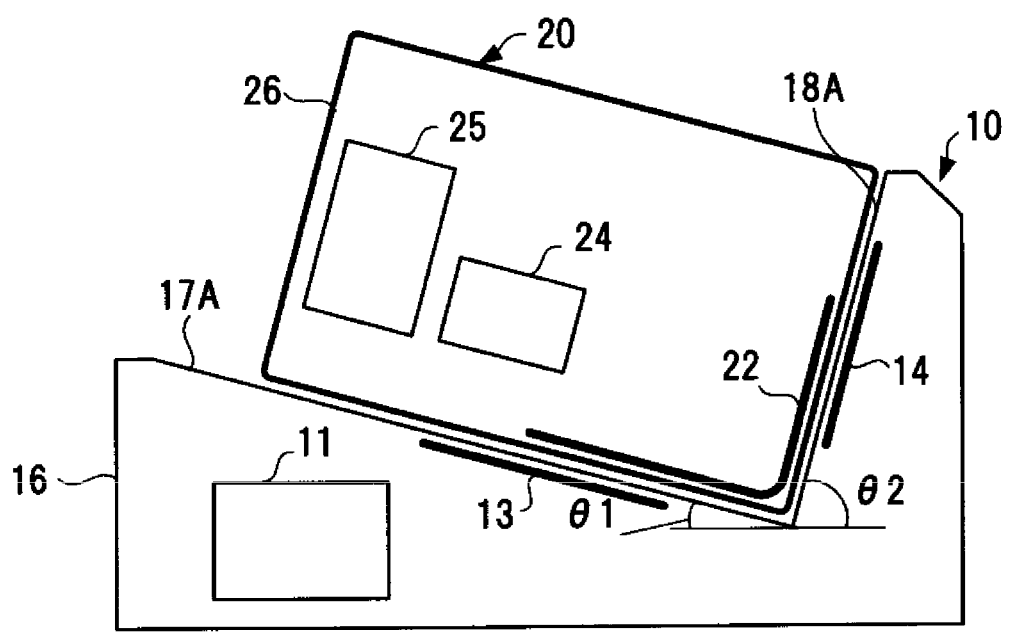
FIG. 21 illustrates the structures of the power transmitter and a power receiver according to the second embodiment.

FIG. 21 is a cross-sectional view illustrating the condition in which the power receiver 20 is placed on the power transmitter 10 shown in FIG. 20. The power receiver 20 includes the power receiving coil 22, the rectification circuit 24, the load circuit 25, and other components. The bottom surface and the side surface of the power receiver 20 contact the surface 17A and the surface 18A of the power transmitter 10, respectively.

It is preferable that an angle $\theta 1$ formed by the surface 17A of the power transmitter 10 and the horizontal surface is an angle in the range allowing the power receiver 20 placed on the power transmitter 10 naturally slides downward along the surface 17A. The preferable range of this angle is in the range from 20 to 30 degrees or larger than 30 degrees depending on the materials of the power transmitter 10 and the power receiver 20. An angle $\theta 2$ formed by the surface 18A and the horizontal surface is calculated by subtracting $\theta 1$ from 90 degrees, in the range from 60 to 70 degrees or smaller than 60 degrees. Examples of the angles $\theta 1$ and $\theta 2$ are: 45 degrees for each of $\theta 1$ and $\theta 2$; 30 degrees for $\theta 1$ and 60 degrees for $\theta 2$; 60 degrees for $\theta 1$ and 30 degrees for $\theta 2$, and others. However, other combinations of angles may be determined. The angle formed by the surface 17A and the surface 18A is not limited to a right angle but maybe other angles suitable for the shape of the power receiver 20.

The power receiver 20 such as a portable device is often housed in a case such as a soft case and a carrying case during use for portability, protection or other purposes. According to the second embodiment, an appropriate positional relationship between the power transmitting coils 13 and 14 and the power receiving coil 22 can be maintained even when the power receiver 20 is housed in the case.

Figure 22:
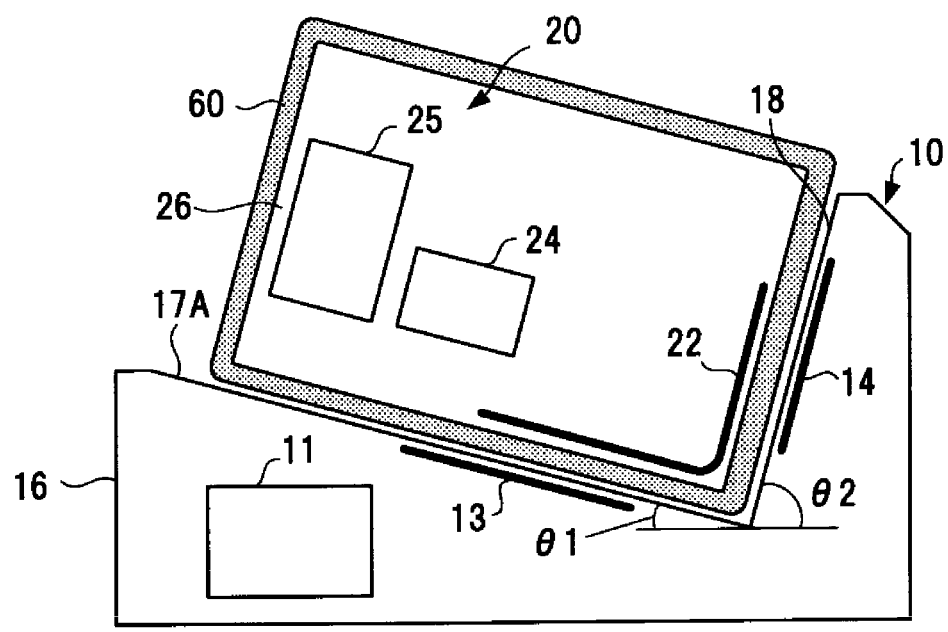
FIG. 22 illustrates the structures of the power transmitter and the power receiver according to another example of the second embodiment.

FIG. 22 is a cross-sectional view illustrating the power receiver 20 carried on the power transmitter 10 while housed in a soft case 60. The power receiver 20 housed in the soft case 60 slides downward along the surface 17A by the inclination of the surface 17A of the power transmitter 10. Thus, the power receiver 20 is placed while the soft case 60 is kept in contact with the surface 18A.

The positional relationship between the power transmitting coils 13 and 14 and the power receiving coil 22 in this example produces an appropriate coupling coefficient k, that is, such a condition which does not excessively separate the power transmitting coils 13 and 14 from the power receiving coil 22, and secures a sufficient area of the power receiving coil 22 opposed to the power transmitting coils 13 and 14. Thus, power transmission from the power transmitter 10 to the power receiver 20 can be achieved with preferable efficiency.

Figure 23:
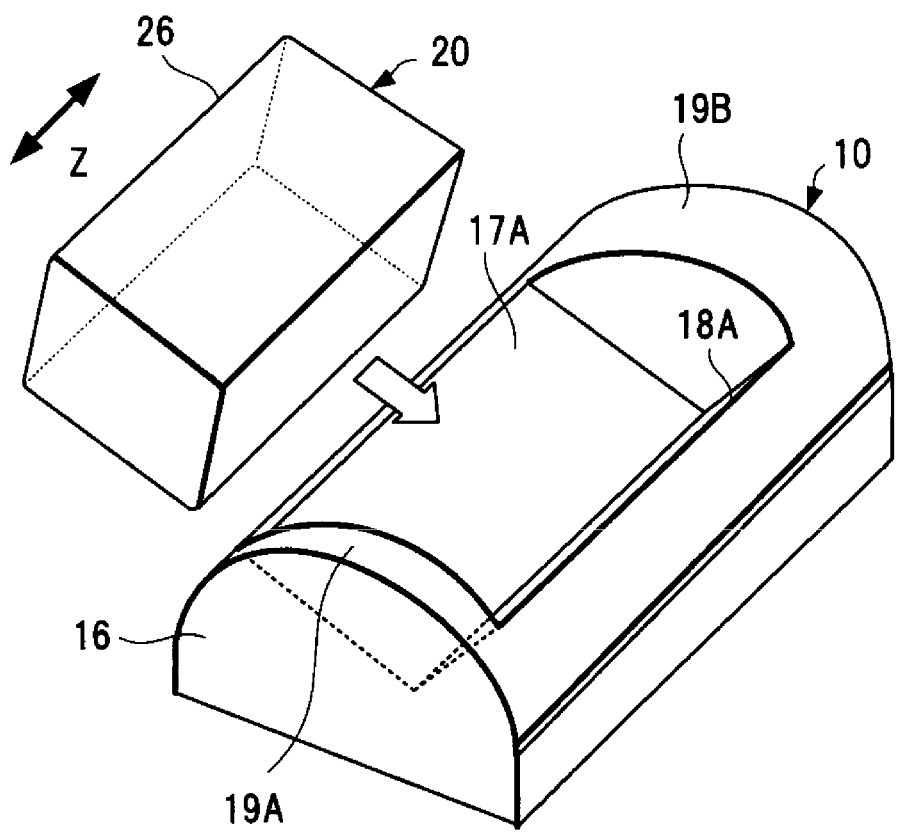
FIG. 23 is a perspective view illustrating the power transmitter and the power receiver according to a modified example of the second embodiment.

FIG. 23 is a perspective view illustrating a modified example of the second embodiment. This example is similar to the example shown in FIG. 20 in that the surface 17A of the housing 16 is inclined to the horizontal surface, and that the surface 18A is inclined to the vertical surface. In addition, this example includes guide surfaces 19A and 19B located on the housing 16 so as to regulate the position of the power receiver 20 in the width direction (direction indicated by an arrow Z).

According to the example in FIG. 23, the surface 17A is inclined to the horizontal surface. Thus, when the power receiver 20 such as a portable device is placed on the power transmitter 10, the power receiver 20 slides toward the surface 18A along the surface 17A by the weight of the power receiver 20, and comes into contact with the surface 18A. Moreover, both sides of the power receiver 20 are guided by the guide surfaces 19A and 19B to be positioned. Thus, the positional relationship between the power transmitting coils 13 and 14 and the power receiving coil 22 is maintained such that the appropriate coupling coefficient k can be obtained.

Accordingly, according to at least one of the embodiments, there is provided a contactless type power transmission device whose coupling coefficient k varies very little even when the distance between the resonance elements of the power transmitter 10 and the power receiver 20 changes.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power transmission device for performing contactless power transmission from a power transmitter to a power receiver, wherein the power transmitter comprises:
a main body having first and second surfaces that are disposed adjacent to each other,
a power transmitting coil disposed within the main body and having a first coil portion corresponding to the first surface and a second coil portion corresponding to the second surface, and
a power source supplying alternating-current power to the power transmitting coil through a resonance capacitor, and the power receiver comprises:
a main body having a third surface and a fourth surface opposed to the first and second surfaces, respectively,
a power receiving coil disposed within the main body and having a third coil portion corresponding to the third surface and a fourth coil portion corresponding to the fourth surface, and
a rectification circuit configured to rectify alternating-current power induced in the power receiving coil, wherein the rectification circuit is connected to the power receiving coil through a resonance capacitor, wherein
currents flowing in the first and second coil portions are set so that currents induced in the third and fourth coil portions by a magnetic field generated by the current flowing in the first and second coil portions, flow in the same direction.

2. The power transmission device according to claim 1, wherein
the first and second coil portions are wound in the same winding direction from an outer circumferential end to an inner circumferential end,
an inner circumferential end of the first coil portion is connected with an outer circumferential end of the second coil portion,
the alternating-current power is supplied from an outer circumferential end of the first coil portion to an inner circumferential end of the second coil portion,
the first and second coil portions are each independent coils, and the third and fourth coil portions are bent parts of one independent coil, and
power is extracted from ends of the bent independent coil.

3. The power transmission device according to claim 1, wherein
the first and second coil portions are wound in the same winding direction from an outer circumferential end to an inner circumferential end,
an inner circumferential end of the first coil portion is connected with an inner circumferential end of the second coil portion,
the alternating-current power is supplied from an outer circumferential end of the first coil portion to an outer circumferential end of the second coil portion,
the third and fourth coil portions are wound in the same winding direction from an outer circumferential end to an inner circumferential end,
an inner circumferential end of the third coil portion is connected with an inner circumferential end of the fourth coil portion, and
power is extracted from an outer circumferential end of the third coil portion and an outer circumferential end of the fourth coil portion.

4. The power transmission device according to claim 1, wherein a relative angle formed by the first coil portion and the second coil portion is equal to or smaller than 90 degrees.

5. The power transmission device according to claim 1, wherein the first surface is inclined with respect to the horizontal plane so that a first end of the first surface at a junction of the first and second surface is lower than a second end of the first surface that is opposite to the first end.

6. The power transmission device according to claim 1, wherein the first and second surfaces are respectively substantially horizontal and substantially vertical surfaces.

7. The power transmission device according to claim 1, wherein the second surface is orthogonal to the first surface and tilted with respect to the vertical plane.

8. The power transmission device according to claim 1, wherein the first and second coil portions are each planar coils and planes of the first and second coil portions are tilted relative to the horizontal and vertical planes, respectively.

9. The power transmission device according to claim 1, wherein the first and second coil portions are connected in series to the power source.

10. The power transmission device according to claim 1, wherein the first and second coil portions are connected in parallel to the power source.

11. A power transmitter for performing contactless power transmission to a power receiver, the power transmitter comprising:
a main body having first and second surfaces that are disposed adjacent to each other and configured to respectively support third and fourth surfaces of a power receiver;
a power transmitting coil disposed within the main body and having a first coil portion corresponding to the first surface and a second coil portion corresponding to the second surface, wherein the first and second coil portions are each an independent coil; and
a power source supplying alternating-current power to the first and second coil portions through a resonance capacitor.

12. The power transmitter according to claim 11, wherein
the first and second coil portions are wound in the same winding direction from an outer circumferential end to an inner circumferential end,
an inner circumferential end of the first coil portion is connected with an inner circumferential end of the second coil portion, and
the alternating-current power is supplied from an outer circumferential end of the first coil portion to an outer circumferential end of the second coil portion.

13. The power transmitter according to claim 11, wherein a relative angle formed by the first coil portion and the second coil portion is equal to or smaller than 90 degrees.

14. The power transmitter according to claim 11, wherein the first surface is inclined with respect to the horizontal plane so that a first end of the first surface at a junction of the first and second surface is lower than a second end of the first surface that is opposite to the first end.

15. The power transmitter according to claim 11, wherein the first and second surfaces are respectively substantially horizontal and substantially vertical surfaces.

16. The power transmitter according to claim 11, wherein the second surface is orthogonal to the first surface and tilted with respect to the vertical plane.

17. A power receiver for receiving power by contactless power transmission from a power transmitter including a first main body having first and second surfaces that are disposed adjacent to each other, and a power transmitting coil disposed within the first main body and including a first coil portion corresponding to the first surface and a second coil portion corresponding to the second surface, the power receiver comprising:

- a second main body having a third surface configured to be supported by the first surface during the contactless power transmission from the power transmitter to the power receiver and a fourth surface configured to be supported by the second surface during the contactless power transmission from the power transmitter to the power receiver;
- a power receiving coil disposed within the second main body and including a third coil portion corresponding to the third surface and a fourth coil portion corresponding to the fourth surface; and
- a rectification circuit configured to rectify alternating-current power induced in the power receiving coil, wherein the rectification circuit is connected to the power receiving coil through a resonance capacitor, wherein currents flowing in the first and second coil portions are set so that currents induced in the third and fourth coil portions by a magnetic field generated by the current flowing in the first and second coil portions, flow in the same direction.

18. The power receiver according to claim 17, wherein the third and fourth coil portions are bent parts of one independent coil, and power is extracted from ends of the bent independent coil.

19. The power receiver according to claim 17, wherein the third and fourth coil portions are wound in the same winding direction from an outer circumferential end to an inner circumferential end, an inner circumferential end of the third coil portion is connected with an inner circumferential end of the fourth coil portion, and power is extracted from an outer circumferential end of the third coil portion and an outer circumferential end of the fourth coil portion.

* * * * *